(12) United States Patent
Hosaki et al.

(10) Patent No.: US 6,210,872 B1
(45) Date of Patent: Apr. 3, 2001

(54) OPTICAL FILM

(75) Inventors: Kenji Hosaki; Yoshihiro Kumagai; Tadahiro Kaminade, all of Kanagawa (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/554,780

(22) PCT Filed: Nov. 18, 1998

(86) PCT No.: PCT/JP98/05177
§ 371 Date: May 18, 2000
§ 102(e) Date: May 18, 2000

(87) PCT Pub. No.: WO99/26093
PCT Pub. Date: May 27, 1999

(30) Foreign Application Priority Data

Nov. 18, 1997 (JP) .................................. 9-316685
Nov. 28, 1997 (JP) .................................. 9-327366

(51) Int. Cl.$^7$ ............................ G03C 1/005; C08G 63/00
(52) U.S. Cl. ................... 430/631; 528/176; 528/188; 430/20; 430/627; 430/495.1
(58) Field of Search .................... 528/176, 188; 430/20, 495.1, 627, 631

(56) References Cited

U.S. PATENT DOCUMENTS

| | | | |
|---|---|---|---|
| 4,710,547 | * | 12/1987 | Uryu et al. ............................. 525/437 |
| 5,391,688 | * | 2/1995 | Mazaki et al. ........................ 528/193 |
| 5,578,243 | * | 11/1996 | Mazaki et al. .................... 252/299.01 |

* cited by examiner

Primary Examiner—Samuel A. Acquah
(74) Attorney, Agent, or Firm—Scully, Scott, Murphy & Presser

(57) ABSTRACT

A novel optical film capable of readily vitrifying the tendency and state of liquid crystal alignment, excellent in the ability to retain the alignment state, and suitable for the application to optical elements. The film is produced from a liquid-crystal material containing as the essential ingredient a liquid-crystal polyester having structural units (A) and (B) as the essential unit, exhibiting a vitrified state at a temperature lower than the liquid-crystal transition point, and having a logarithmic viscosity number ($\eta$) of 0.04–0.4 dl/g as measured at 30° C. in a phenol/tetrachloroethane solvent (60/40 by weight), wherein each X represents independently O or C=O; each Y represents independently a group selected from among F, Cl, Br and 1–4C alkyls; and n is 0 or 1.

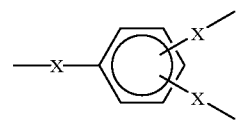

(A)

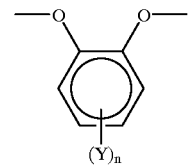

(B)

5 Claims, 1 Drawing Sheet

OPTICAL FILM

FIELD OF THE INVENTION

The present invention relates to a novel optical film superior in liquid crystal orientability, permitting easy fixing of an oriented state in glass phase, having a high liquid crystal orientation holding ability, and suitable for application to optical elements.

PRIOR ART

Various liquid crystalline polymers have been developed and commercialized in the field of high-performance materials, utilizing their dynamic characteristics such as having high elasticity, high rigidity, high heat resistance, and superior moldability. It is well known that liquid crystalline polymers possess both a structural and optical anisotropy based on the liquid crystal and an orientation fixing ability based on the polymers. In recent years, researches and developments have been done actively for using liquid crystalline polymers in the field of functional materials such as optical members for a liquid crystal display by utilizing their property just mentioned above.

For making the most of the optical anisotropy of liquid crystalline polymers it is necessary that liquid crystal molecules be oriented to a sufficient extent. For enhancing the orientability of liquid crystal molecules it is preferable that the structural units of the liquid crsytalline polymers be structural units obtained from bifunctional compounds and assume the form of a molecular structure wherein they are arranged on straight lines with respect to each other. From such a standpoint, liquid crystalline polymers with a twisted nematic orientation fixed, which are used for optical elements, are made up of only such structural units as are obtained from bifunctional compounds, as is disclosed in Japanese Patent Nos. 2592694 and 2592701. However, optical elements fabricated from such liquid crystalline polymers have so far not satisfactory in point of an orientation holding ability because there the orientation formed is disordered upon exertion of an external force thereon at a temperature above the glass transition points of the polymers.

OBJECT OF THE INVENTION

It is an object of the present invention to solve the above-mentioned problem of the prior art and particularly provide a novel optical film easy to fix a liquid crystal orientation in glass phase, superior in the orientation holding ability, and suitable for the application to optical elements.

SUMMARY OF THE INVENTION

Using a liquid crystalline polyester with a specific structural unit introduced into a polymer chain as a main chain, the present inventors have formed the polyester into an optical film and found that the optical film is superior in both orientability and orientation holding ability.

More specifically, the present invention is firstly concerned with an optical film formed substantially from a liquid crystalline material. constituted essentially by a liquid crystalline polyester, the liquid crystalline polyester having the following structural units (A) and (B) as essential structural units, assuming a liquid crystal state at a temperature higher than the liquid crystal transition point of the polyester and a glassy state at a temperature lower than the liquid crystal transition point of the polyester, and having an inherent viscosity, η, of 0.04 to 0.4 dl/g as determined in a mixed phenol/tetrachloroethane (weight ratio: 60/40) solvent at 30° C.:

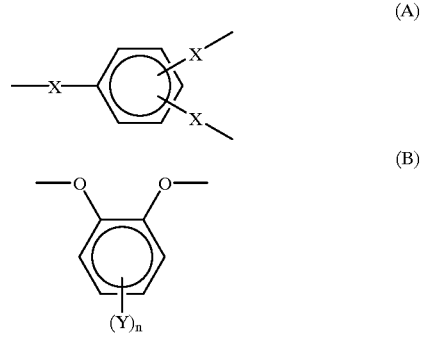

where each X represents O or C=O independently, each Y is independently selected from F, Cl, Br, and an alkyl group having 1 to 4 carbon atoms, and n is 0 or 1.

The present invention is secondly concerned with the above optical film wherein the liquid crystalline material does not essentially contain any optically active component.

The present invention is thirdly concerned with the above optical film wherein the liquid crystalline material is a twisted nematic or smectic liquid crystalline polyester having an optically active group in the molecule thereof.

The present invention is fourthly concerned with the above optical film wherein the liquid crystalline material is a composition consisting essentially of a liquid crystalline polyester and an optically active compound, which liquid crystalline polyester is the polyester mentioned in the above second aspect of the invention.

EMBODIMENTS OF THE INVENTION

The present invention will be described in detail herein under.

As liquid crystalline materials employable in the present invention are mentioned the following materials:

① a nematic (or smectic) liquid crystalline polyester having the structural units (A) and (B) as essential structural units;

② a composition comprising a nematic (or smectic) liquid crystalline polyester having the structural units (A) and (B) as essential structural units and an optically active low-molecular compound;

③ a composition comprising a nematic (or smectic) liquid crystalline polyester having the structural units (A) and (B) as essential structural units and an optically active high-molecular compound; and ④ a twisted nematic (or smectic) liquid crystalline polyester having the structural units (A) and (B) as essential structural units and having an optically active group in the molecule thereof.

The nematic (or smectic) liquid crystalline polyester mentioned in each of the above ①, ② and ③ forms a nematic (or smectic) orientation free from a twist structure in the state of liquid crystal.

Description will first be directed to the structural units (A) and (B).

The structural unit (A) is formed from a benzenetricarboxylic acid or a trihydroxybenzene. To be more specific, it is a structural unit formed from any of trimesic acid (1,3,5-bezenetricarboxylic acid), trimellitic acid (1,2,4-benzenetricarboxylic acid), phloroglucinol (1,3,5-trihydroxybenzene), and derivatives thereof. In the present invention, structural units formed from trimesic acid and derivatives thereof are particularly preferred.

In the structural units which constitute the liquid crystalline polyester concerned, the proportion of the structural unit (A) is usually in the range of 0.05 to 15 mol %, preferably 0.10 to 7.5 mol %, particularly preferably 0.20 to 5 mol %. If its proportion is smaller than 0.05 mol %, it may be impossible to improve the orientation holding ability, and if it is larger than 15 mol %, the orientability may be deteriorated markedly.

The structural unit (B) is formed from catechol and derivatives thereof. Examples are as follows:

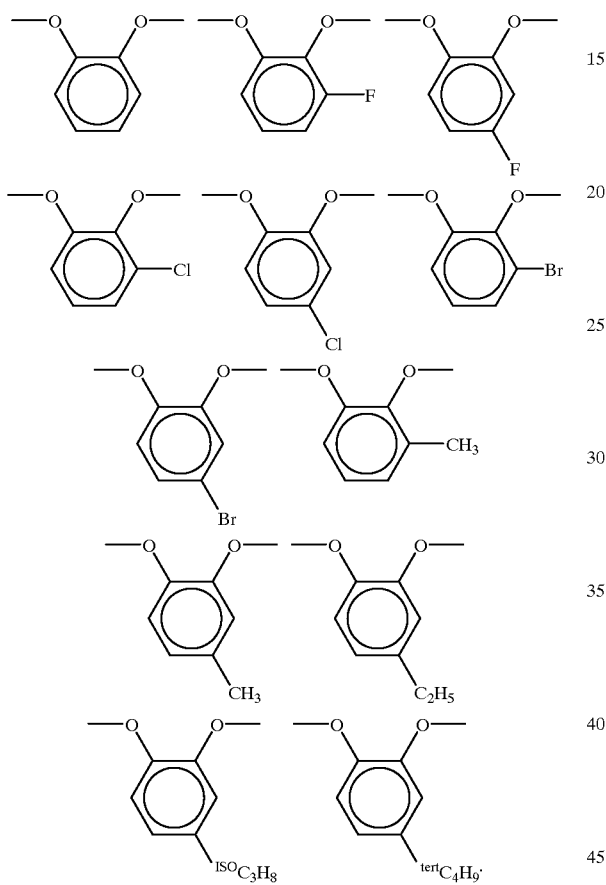

Among them, the following are particularly preferred in the present invention:

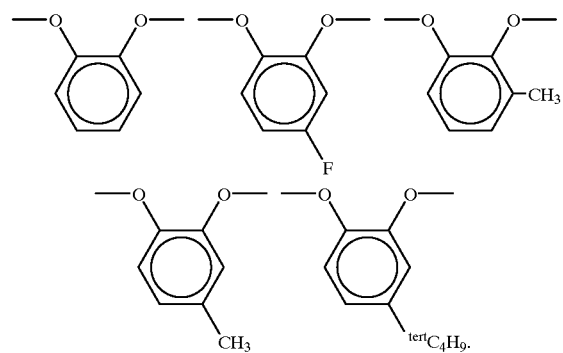

In the structural units which constitute the liquid crystalline polyester, the proportion of the structural unit (B) is in the range of usually 5 to 60 mol %, preferably 7 to 60 mol %. If its proportion is less than 5 mol %, it may be impossible to fix a liquid crystal orientation in glass phase.

In the liquid crystalline polyester used in the present invention, other structural units are not specially limited insofar as they can form the polyester structure and insofar as the structural units (A) and (B) are contained as essential structural units in the bond which constitutes a main chain. As examples of such other structural units, mention may be made of the following aromatic structural units:

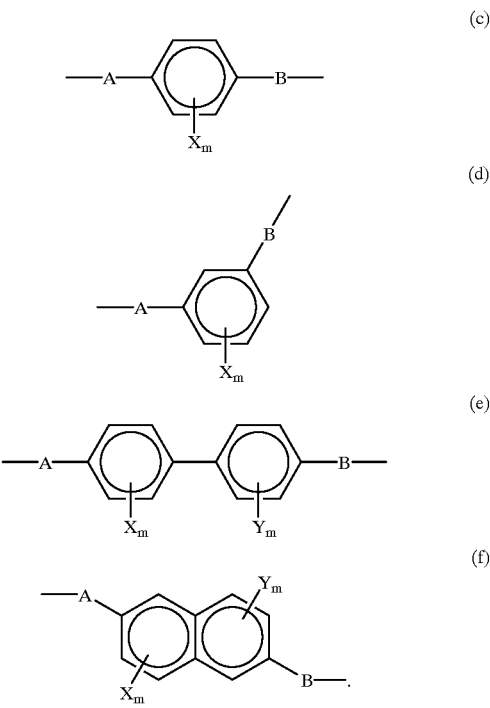

where A and B, which may be the same or different, are each independently a carbonyl bond (C=O) or oxygen (O), X and Y, which may be the same or different, are each independently selected from the group consisting of F, Cl, Br, and alkyl groups having 1 to 4 carbon atoms (e.g., methyl, ethyl, propyl, isopropyl, n-butyl, sec-butyl, and tert-butyl), and m and n, which may be the same or different, are each an integer of 0 to 4.

These structural units are formed from terephthalic acid or derivatives thereof, substituted terephthalic acid or derivatives thereof, hydroquinone or derivatives thereof, substituted hydroquinone or derivatives thereof, 4-hydroxybenzoic acid or derivatives thereof, substituted 4-hydroxybenzoic acid or derivatives thereof, isophthalic acid or derivatives thereof, substituted isophthalic acid or derivatives thereof, resorcinol or derivatives thereof, substituted resorcinol or derivatives thereof, 3-hydroxybenzoic acid or derivatives thereof, substituted 3-hydroxybenzoic acid or derivatives thereof, 4,4'-biphenyldicarboxylic acid or derivatives thereof, substituted 4,4'-biphenyldicarboxylic acid or derivatives thereof, 4,4'-substituted biphenol or derivatives thereof, 4'-hydroxy-4-biphenylcarboxylic acid or derivatives thereof, substituted 4'-hydroxy-4-biphenylcarboxylic acid or derivatives thereof, 2,6-naphthalenedicarboxylic acid or derivatives thereof, substituted 2,6-naphthalenedicarboxylic acid or derivatives thereof, 2,6-naphthalenediol or derivatives thereof, substituted 2,6-naphthalenediol or derivatives thereof, 6-hydroxy- 2-naphthoic acid or derivatives thereof, and substituted 6-hydroxy-2-naphthoic acid or derivatives thereof. Concrete examples are as follows:
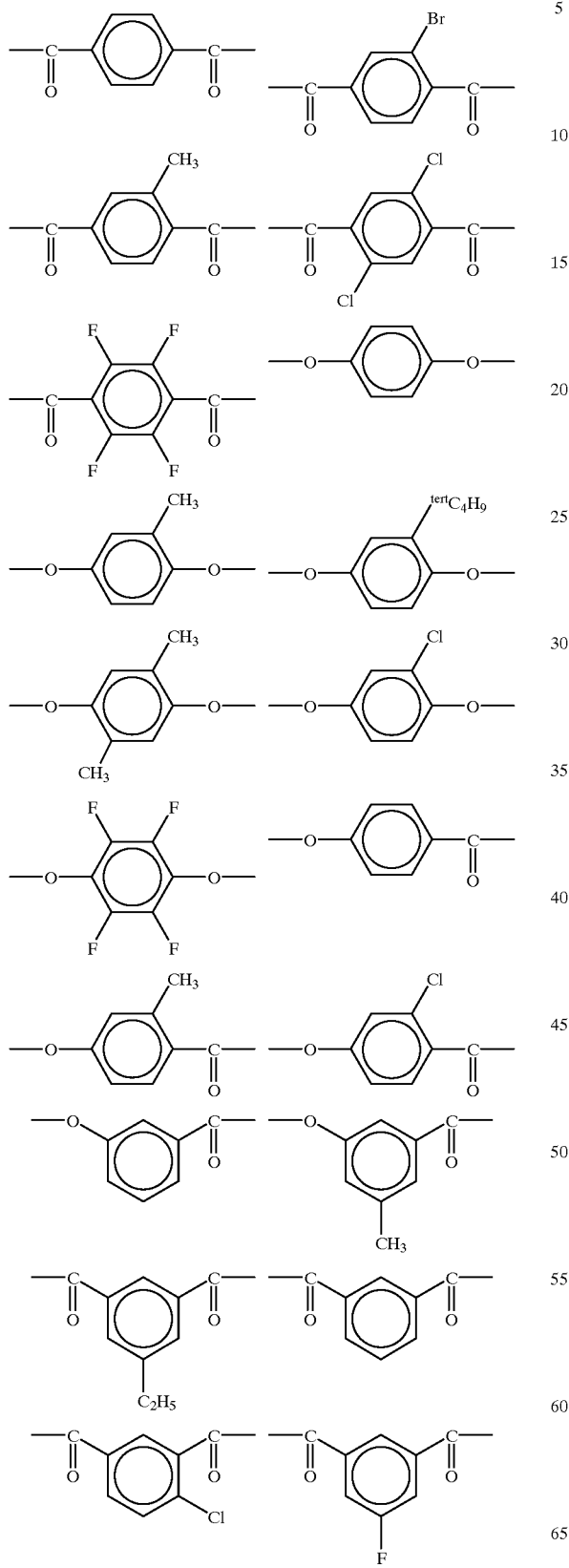
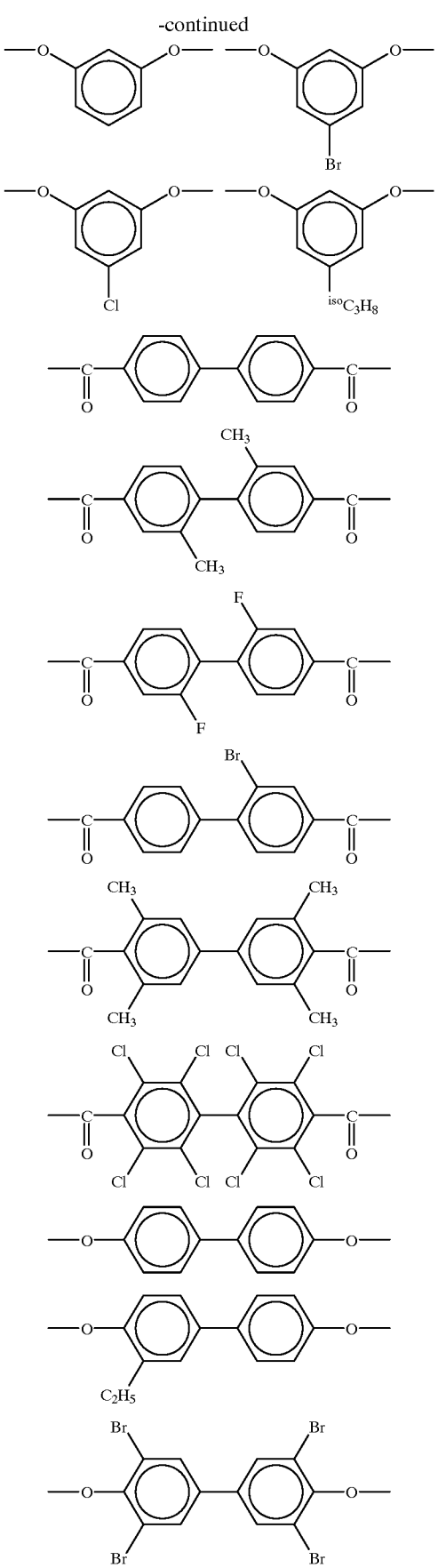

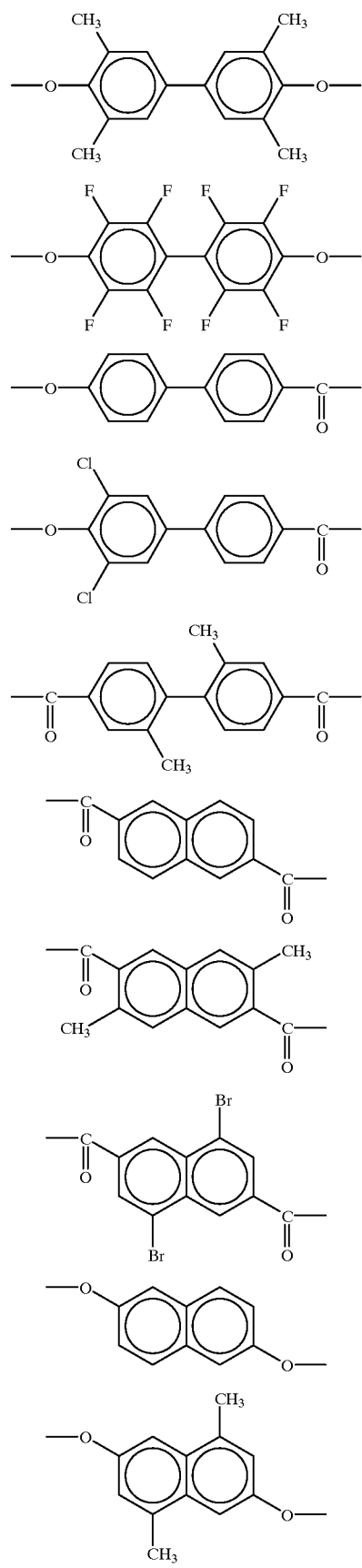
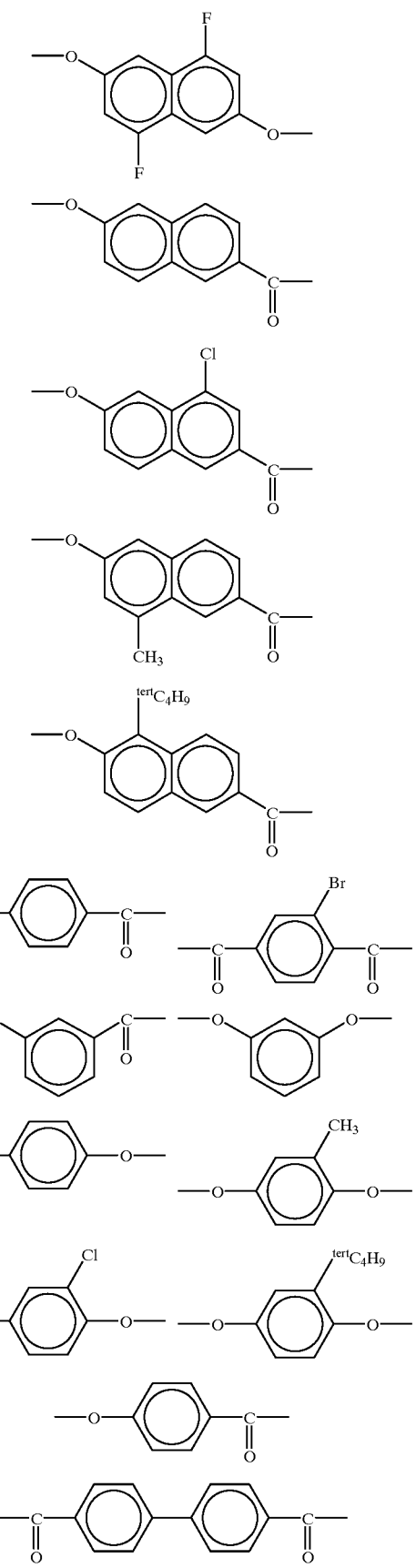

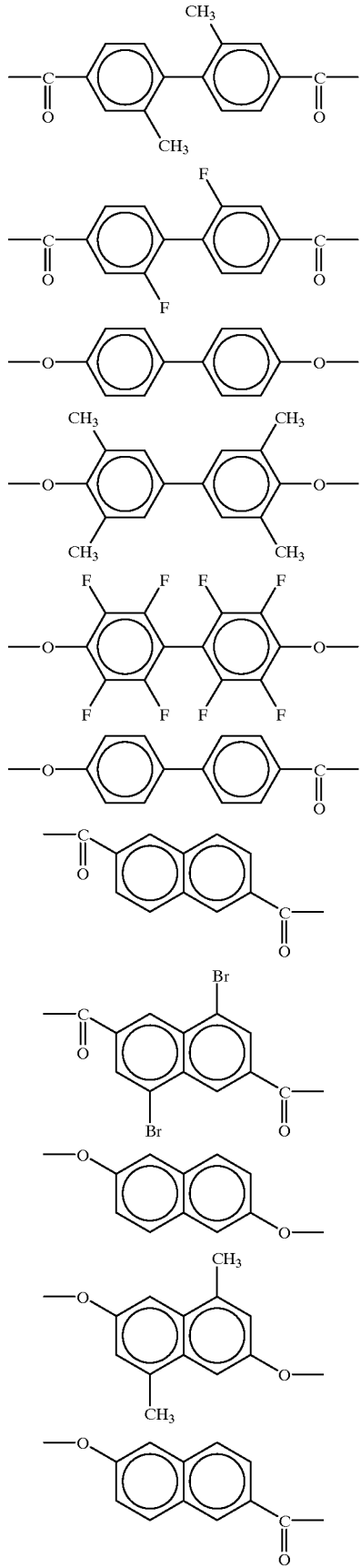

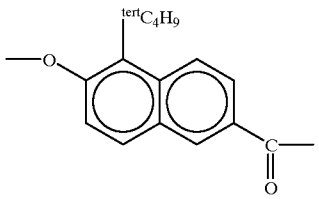

The above are preferred. The following units are also preferred.

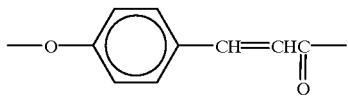

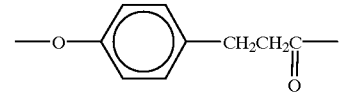

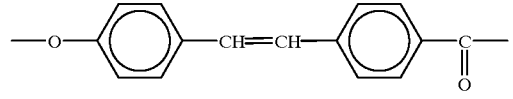

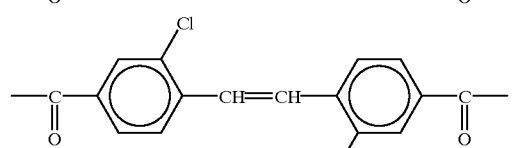

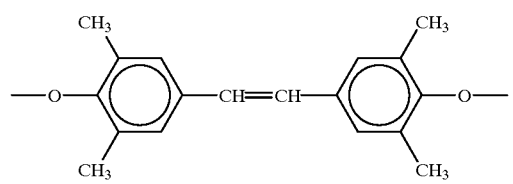

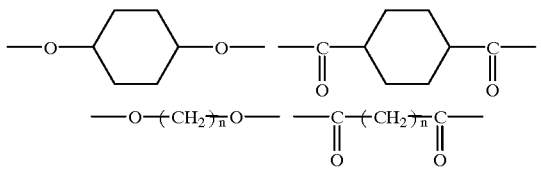

(n is an integer of 2~12)

The preferable liquid crystalline polymers used in the present invention are usually constituted by the following units:
(A) unit derived from trimesic acid which is a typical one of the structural unit (A) (hereinafter, referred to as trimesic acid structural unit).
(B) unit derived from a catechol which is a typical one of the structural unit (B) (hereinafter, referred to as catechol structural unit).
(c) unit derived from a dicarboxylic acid (hereinafter referred to as dicarboxylic acid unit).
(d) unit derived from a diol other than catechols (herein after, referred to as diol structural unit).

(e) and, unit derived from a hydroxycarboxylic acid having a carboxyl group and a hydroxy group in one structural unit (hereinafter, referred to as hydroxycarboxylic acid unit).

Example of the polyester structures are [(a)+(b)+(c)] type, [(a)+(b)+(c)+(d)] type, [(a)+(b)+(c)+(e)] type, [(a)+(b)+(c)+(d)+(e)] type and the like.

The preferable ratio of the respective structural units in the liquid crystalline are not specially defined since the optimum ratios differ depending on the structural units to be used in the polyester. Usually, the ratio of the total number of the functional groups in the diol structural unit and the catechol structural unit to the total number of the dicarboxylic acid structural unit and trimesic acid structural unit is in the range of 0.90 to 1.20, preferably in the range of 0.95 to 1.10, more preferably in the range of 1.00 to 1.05. The ratio of the trimesic acid structural unit to the total of the dicarboxylic acid structural unit and the trimesic acid structural unit is usually in the range of 0.5 to 30 mol %, more preferably in the range of 1.0 to 15 mol %, more preferably in the range of 2.0 to 10 mol %. The ratio of the catechol structural unit to the total of the diol structural unit and the catechol structural unit is usually in the range of 10 to 100 mol %, preferably in the range of 20 to 100 mol %, more preferably in the range of 30 to 100 mol %. The ratio of the hydroxycarboxylic acid structural unit to the total of all of the structural units is usually in the range of 0–60 mol %, preferably in the range of 0 to 50 mol %, more preferably in the range of 0 to 40 mol %.

Examples of the structures of the liquid crystalline polyester preferably used in the present invention are as follows.

(Structural formula 1)

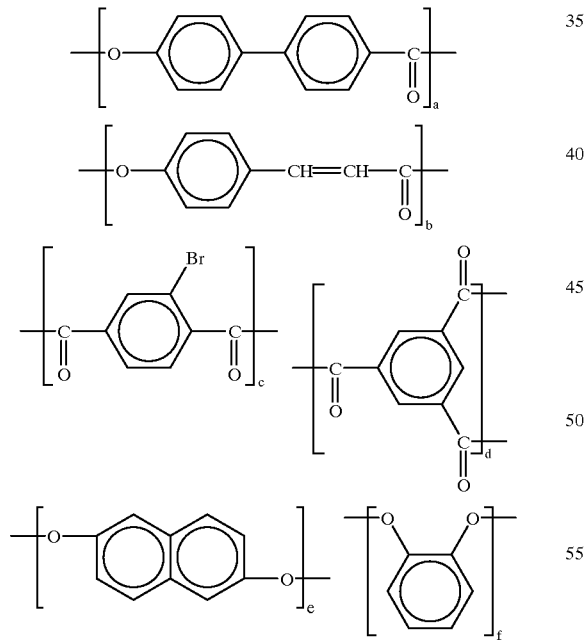

$(2e+2f)/(2c+3d)=0.90-1.20$, perferably 0.95–1.10, more preferably 1.00–1.05

$d/(c+d)=0.005-0.30$, preferably 0.01–0.15 more preferably 0.02–0.10

$f/(e+f)=0.3-1.0$, preferably 0.4–1.0

$a/b=100/0-0/100$ $(a+b)/(a+b+c+d+e+f)=0-0.6$ (a, b, c, d, e and f show each a mole composition ratio.)

(Structural formula 2)

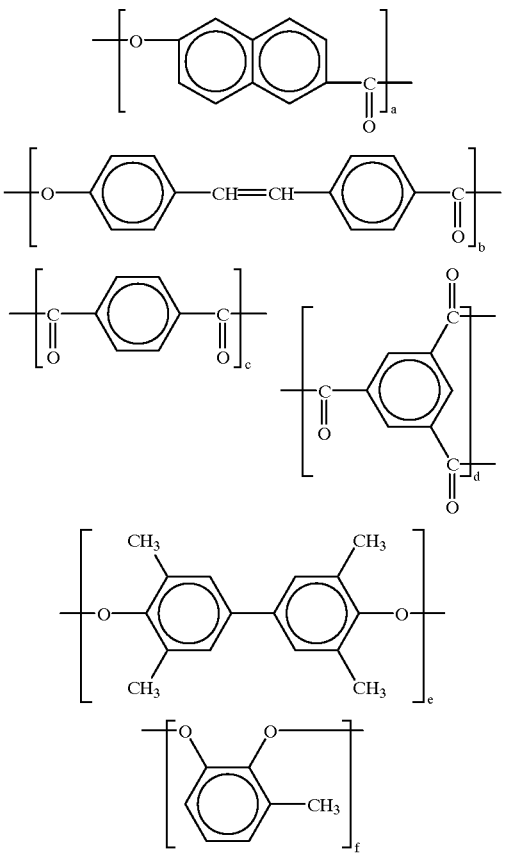

$(2e+2f)/(2c+3d)=0.90-1.20$, perferably 0.95–1.10, more preferably 1.00–1.05

$d/(c+d)=0.005-0.30$, preferably 0.01–0.15 more preferably 0.02–0.10

$f/(e+f)=0.3-1.0$, preferably 0.4–1.0

$a/b=100/0-0/100$ $(a+b)/(a+b+c+d+e+f)=0-0.6$ (a, b, c, d, e and f show each a mole composition ratio.)

(Structural unit 3)

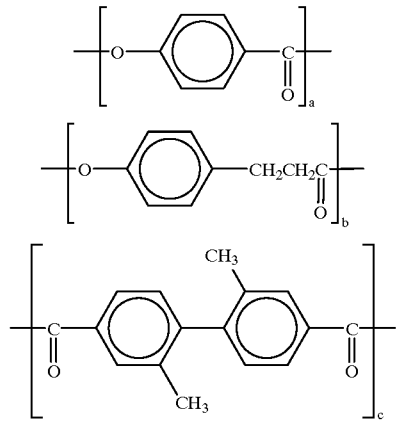

-continued

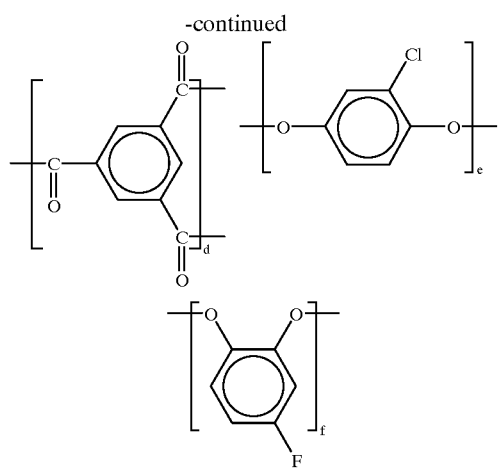

(2e+2f)/(2c+3d)=0.90–1.20, perferably 0.95–1.10, more preferably 1.00–1.05 d/(c+d)=0.005–0.30, preferably 0.01–0.15 more preferably 0.02–0.10 f/(e+f)=0.3–1.0, preferably 0.4–1.0 a/b=100/0–0/100

(a+b)/(a+b+c+d+e+f)=0–0.6

(a, b, c, d, e and f show each a mole composition ratio.)

(Structural formula 4)

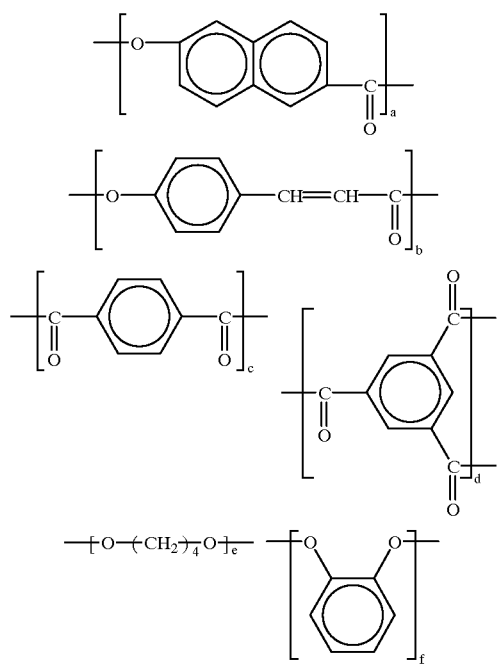

(2e+2f)/(2c+3d)=0.90–1.20, perferably 0.95–1.10, more preferably 1.00–1.05 d/(c+d)=0.005–0.30, preferably 0.01–0.15 more preferably 0.02–0.10 f/(e+f)=0.3–1.0, preferably 0.4–1.0 a/b=100/0–0/100

(a+b)/(a+b+c+d+e+f)=0–0.6

(a, b, c, d, e and f show each a mole composition ratio.)

(Structural formula 5)

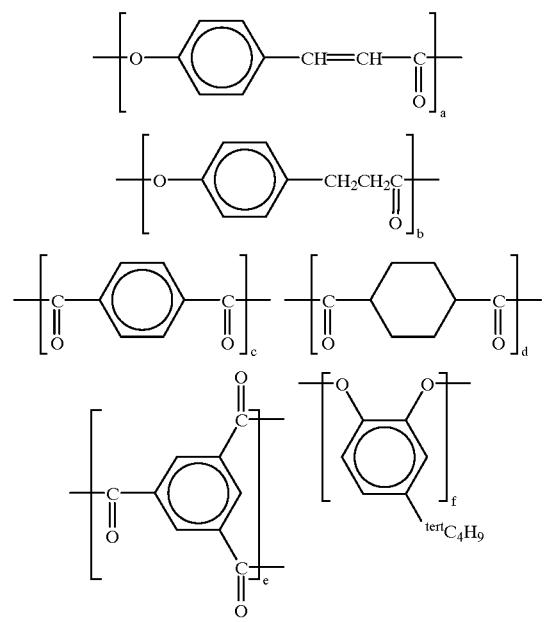

2f/(2c+2d+3e)=0.90–1.20, perferably 0.95–1.10, more preferably 1.00–1.05 e/(c+d+e)=0.005–0.30, preferably 0.01–0.15 more preferably 0.02–0.10 a/b=100/0–0/100

(a+b)/(a+b+c+d+e+f)=0–0.6

(a, b, c, d, e and f show each a mole composition ratio.)

(Structural formula 6)

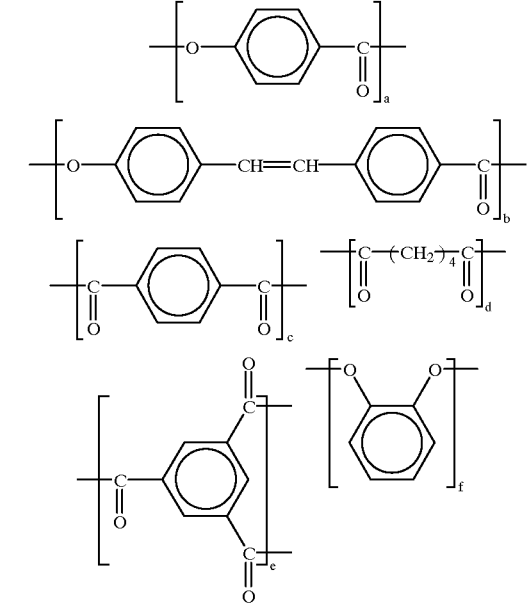

2f/(2c+2d+3e)=0.90–1.20, perferably 0.95–1.10, more preferably 1.00–1.05 e/(c+d+e)=0.005–0.30, preferably 0.01–0.15 more preferably 0.02–0.10 a/b=100/0–0/100

(a+b)/(a+b+c+d+e+f)=0–0.6

(a, b, c, d, e and f show each a mole composition ratio.)

(Structural formula 7)

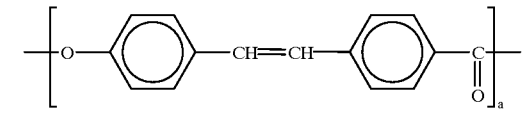

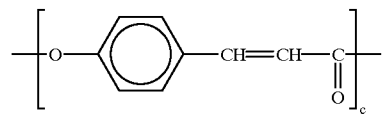

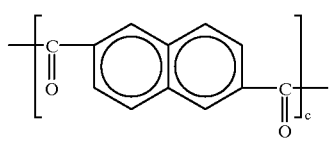

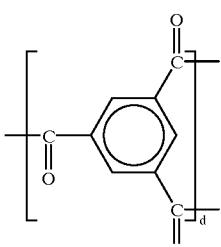

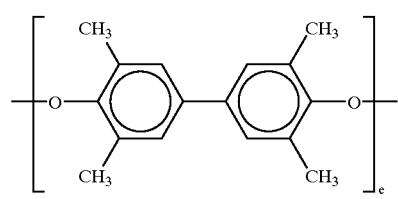

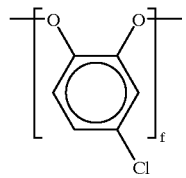

(2e+2f)/(2c+3d)=0.90–1.20, perferably 0.95–1.10, more preferably 1.00–1.05 d/(c+d)=0.005–0.30, preferably 0.01–0.15 more preferably 0.02–0.10 f/(e+f)=0.3–1.0, preferably 0.4–1.0 a/b=100/0–0/100

(a+b)/(a+b+c+d+e+f)=0–0.6

(a, b, c, d, e and f show each a mole composition ratio.)

(Structural formula 8)

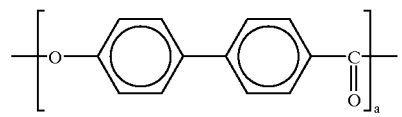

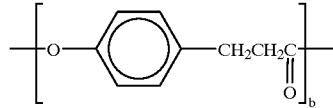

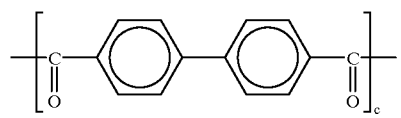

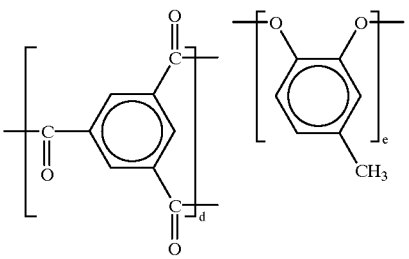

2e/(2c+2d+3e)=0.90–1.20, perferably 0.95–1.10, more preferably 1.00–1.05 d/(c+d)=0.005–0.30, preferably 0.01–0.15 more preferably 0.02–0.10 a/b=100/0–0/100

(a+b)/(a+b+c+d+e+f)=0–0.6

(a, b, c, d, e and f show each a mole composition ratio.)

(Structural formula 9)

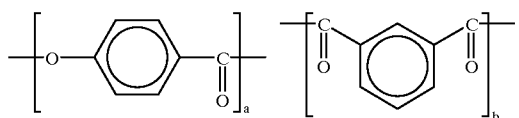

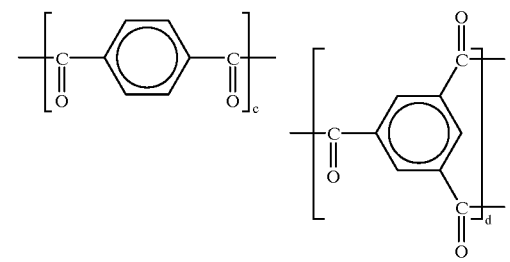

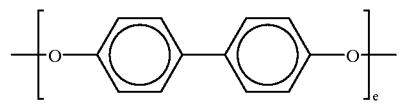

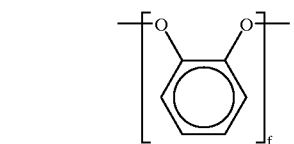

(2e+2f)/(2b+2c+3d)=0.90–1.20, perferably 0.95–1.10, more preferably 1.00–1.05 d/(b+c+d)=0.005–0.30, preferably 0.01–0.15 more preferably 0.02–0.10 f/(e+f)=0.3–1.0, preferably 0.4–1.0

(a+b)/(a+b+c+d+e+f)=0–0.6

(a, b, c, d, e and f show each a mole composition ratio.)

(Structural formula 10)

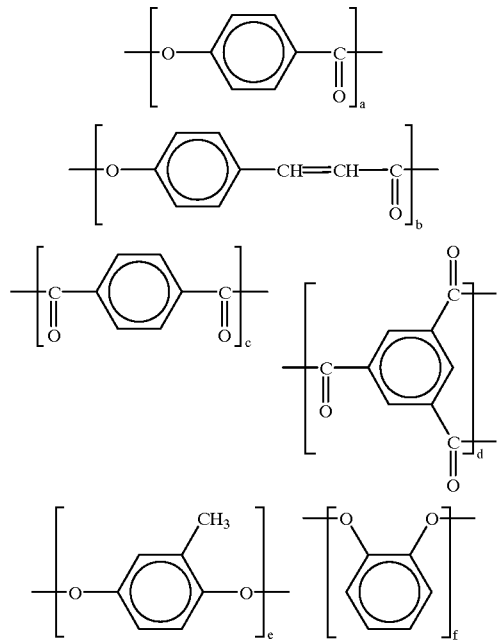

$(2e+2f)/(2c+3d)=0.90–1.20$, perferably 0.95–1.10, more preferably 1.00–1.05

$d/(c+d)=0.005–0.30$, preferably 0.01–0.15 more preferably 0.02–0.10

$f/(e+f)=0.3–1.0$, preferably 0.4–1.0

$a/b=100/0–0/100$ $(a+b)/(a+b+c+d+e+f)=0–0.6$ (a, b, c, d, e and f show each a mole composition ratio.)

(Structural formula 11)

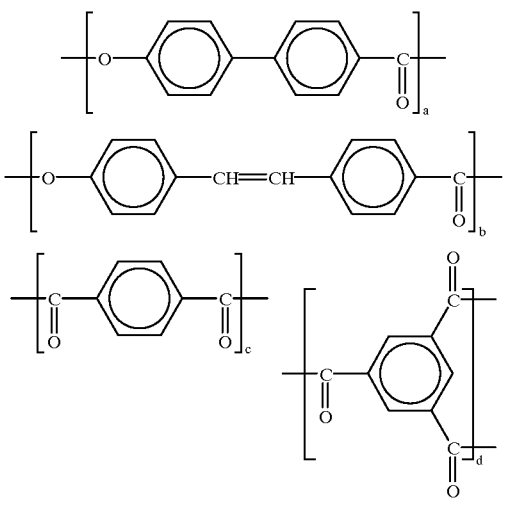

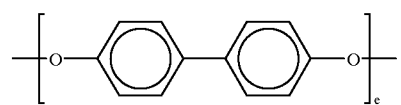

$(2e+2f)/(2c+3d)=0.90–1.20$, perferably 0.95–1.10, more preferably 1.00–1.05

$d/(c+d)=0.005–0.30$, preferably 0.01–0.15 more preferably 0.02–0.10

$f/(e+f)=0.3–1.0$, preferably 0.4–1.0

$a/b=100/0–0/100$ $(a+b)/(a+b+c+d+e+f)=0–0.6$ (a, b, c, d, e and f show each a mole composition ratio.)

(Structural formula 12)

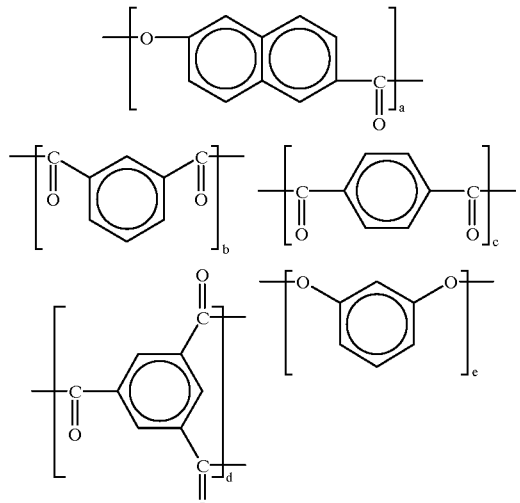

$(2e+2f)/(2b+2c+3d)=0.90–1.20$, perferably 0.95–1.10, more preferably 1.00–1.05

$d/(b+c+d)=0.005–0.30$, preferably 0.01–0.15 more preferably 0.02–0.10

$f/(e+f)=0.3–1.0$, preferably 0.4–1.0

$a/(a+b+c+d+e+f)=0–0.6$ (a, b, c, d, e and f show each a mole composition ratio.)

(Structural formula 13)

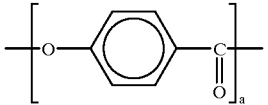

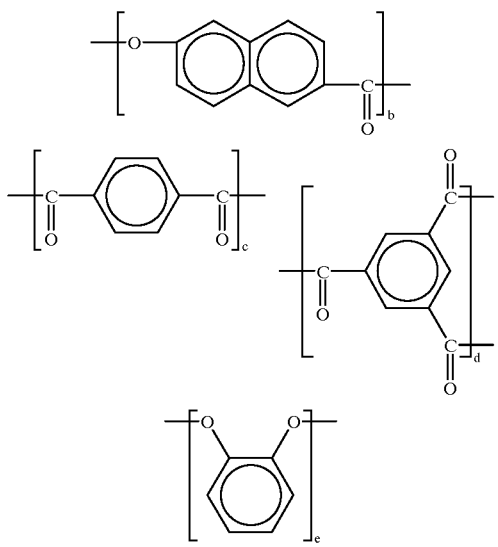

2e/(2c+3d)=0.90–1.20, preferably 0.95–1.10, more preferably 1.00–1.05
d/(c+d) 0.005–0.30, preferably 0.01–0.15 more preferably 0.02–0.10
a/b=100/0–0/100
(a+b)/(a+b+c+d+e)=0–0.6
(a, b, c, d, and e show each a mole composition ratio.)

(Structural formula 14)

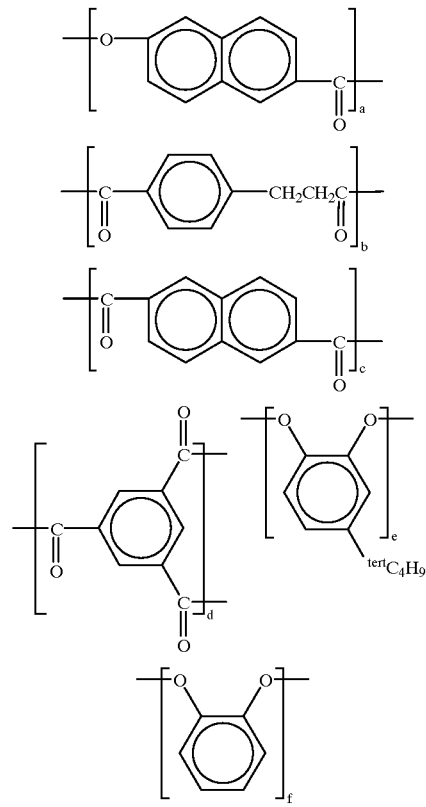

(2e+2f)/(2c+3d)=0.90–1.20, preferably 0.95–1.10, more preferably 1.00–1.05 d/(c+d)=0.005–0.30, preferably 0.01–0.15 more preferably 0.02–0.10
f/(e+f)=0.3–1.0, preferably 0.4–1.0
a/b=100/0–0/100
(a+b)/(a+b+c+d+e+f)=0–0.6
(a, b, c, d, e and f show each a mole composition ratio.)

(Structural formula 15)

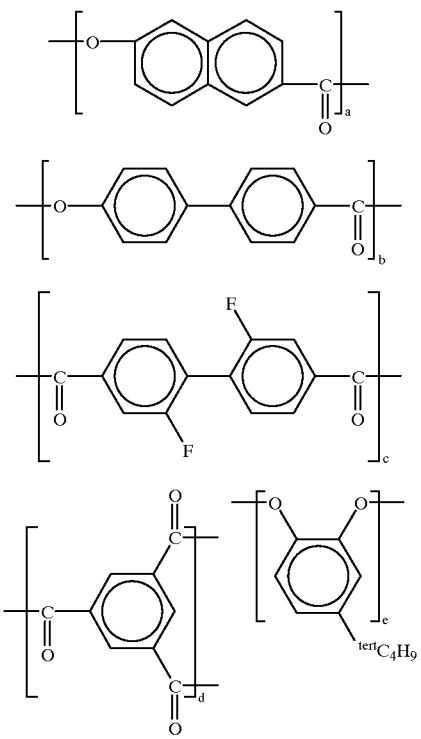

2e/(2c+3d)=0.90–1.20, preferably 0.95–1.10, more preferably 1.00–1.05
d/(c+d)=0.005–0.30, preferably 0.01–0.15 more preferably 0.02–0.10
a/b=100/0–0/100
(a+b)/(a+b+c+d+e)=0–0.6
(a, b, c, d, and e show each a mole composition ratio.)

(Structural formula 16)

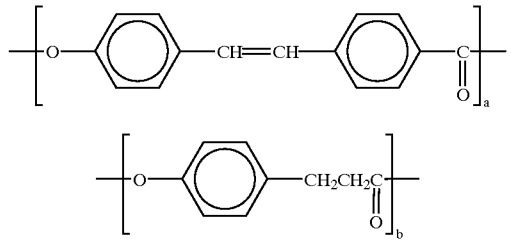

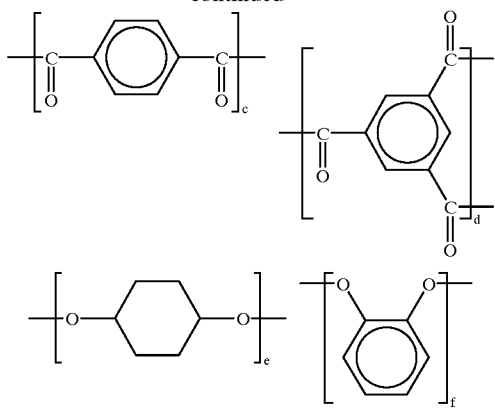

$(2e+2f)/(2c+3d)=0.90–1.20$, preferably 0.95–1.10, more preferably 1.00–1.05
$d/(c+d)=0.005–0.30$, preferably 0.01–0.15 more preferably 0.02–0.10
$f/(e+f)=0.3–1.0$, preferably 0.4–1.0
$a/b=100/0–0/100$
$(a+b)/(a+b+c+d+e+f)=0–0.6$
(a, b, c, d, e and f show each a mole composition ratio.)

(Structural formula 17)

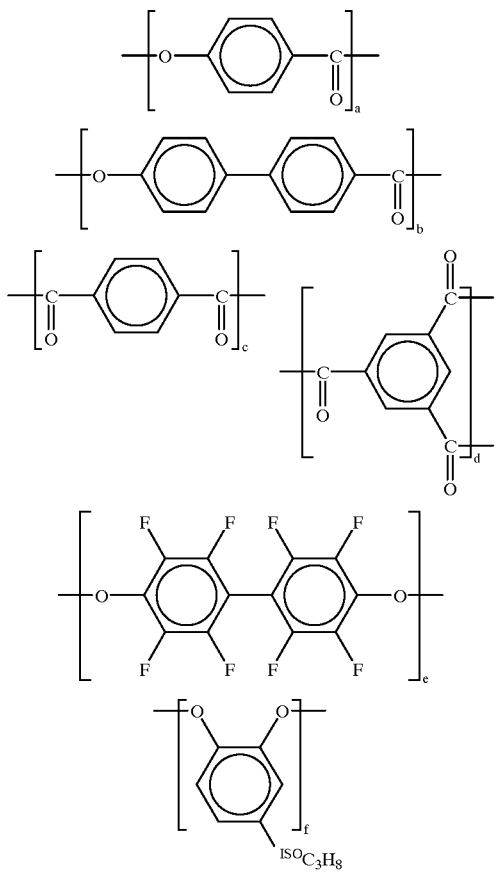

$(2e+2f)/(2c+3d)=0.90–1.20$, preferably 0.95–1.10, more preferably 1.00–1.05
$d/(c+d)=0.005–0.30$, preferably 0.01–0.15 more preferably 0.02–0.10
$f/(e+f)=0.3–1.0$, preferably 0.4–1.0
$a/b=100/0–0/100$
$(a+b)/(a+b+c+d+e+f)=0–0.6$
(a, b, c, d, e and f show each a mole composition ratio.)

The above liquid crystalline polyester can be prepared by a polymerization process known in the field concerned, e.g., a melt polymerization process or a solution polymerization process.

According to the melt polymerization process, predetermined amounts of trimesic acid (a structural unit (A) forming monomer), an acetylated compound of catechol (a structural unit (B) forming monomer), and optionally a dicarboxylic acid (a dicarboxylic acid structural unit forming monomer), an acetylated compound of diol (a diol structural unit forming monomer), and an acetylated compound of a hydroxycarboxylic acid (a hydroxycarboxylic acid structural unit forming monomer), are copolymerized at a high temperature and under atmospheric or reduced pressure or under a high vacuum, whereby there can be obtained a desired liquid crystalline polyester easily.

A feed ratio of monomers which form the.respective structural units is set in such a manner that, as described above, 0.05 to 15 mol %, more preferably 0.10 to 7.5 mol %, particularly preferably 0.20 to 5 mol %, of trimesic acid (a structural unit (A) forming monomer), and 5 to 60 mol %, preferably 7 to 60 mol %, of catechol (a structural unit (B) forming monomer), are contained in the polyester concerned. Also as to the other optional components—dicarboxylic acid (a dicarboxylic acid structural unit forming monomer), diol (a diol structural unit forming monomer), and hydroxycarboxylic acid (a hydroxycarboxylic acid structural unit forming monomer)—, an appropriate feed ratio is established so that:

① the ratio of the total number of functional groups contained in the diol and catechol structural units to the total number of functional groups contained in the dicarboxylic and trimesic acid structural units is in the range of 0.95 to 1.10, preferably 1.00 to 1.05;

② the proportion of trimesic acid structural units in the total structural units of dicarboxylic and trimesic acids is usually in the range of 0.5 to 30 mol %, preferably 1.0 to 15 mol %, particularly preferably 2.0 to 10 mol %;

③ the ratio of catechol structural units in the total catechol and diol structural units is usually in the range of 30 to 100 mol %, preferably 40 to 100 mol %;

④ the proportion of hydroxycarboxylic acid structural units in the total structural units is usually in the range of 0 to 60 mol %, preferably 0 to 50 mol %, particularly preferably 0 to 40 mol %.

Polymerization conditions are not specially limited, but usually involve a temperature of 150 ° to 350° C., preferably 200 ° to 300° C., and a reaction time of 30 minutes or more, preferably 1 to 20 hours. For accelerating the polyerization reaction there may be used amines such as 1-methylimidazole and 4-dimethylaminopyridine, as well as metallic salts of metals such as alkali metals, Fe, Mn, Ti, Co, Sb, and Sn, each alone or in combination. For the purpose of diminishing coloration of the polyester there may be used various antioxidants. Further, the molecular weight of the polyester can be adjusted easily as in the ordinary condensation reaction, for example, by controlling the polymerization time.

The molecular weight of the liquid crystalline polyester is usually in the range of 0.04 to 0.4 dl/g, preferably 0.06 to 0.3 dl/g, particularly preferably 0.1 to 0.25 dl/g, in terms of an inherent viscosity as determined in a mixed phenol/tetrachloroethane solvent (weight ratio: 60/40) at 30° C. If the inherent viscosity is less than 0.05 dl/g, the strength of film formed from the polyester will be low, and if it is more than 0.4 dl/g, the viscosity will be high in the formation of liquid crystal, with consequent deterioration of orientability and increase of the time required for orientation. Thus, both such cases are not desirable.

In preparing a liquid crystalline polyester for use in the present invention in accordance with the solution polymerization process, for example, predetermined amounts of trimesic acid (a structural unit (A) forming monomer), a dicarboxylic acid (a dicarboxylic acid structural unit forming monomer), and a hydroxycarboxylic acid (a hydroxycarboxylic acid structural unit forming monomer) are subjected to the action of a chlorinating agent such as thionyl chloride for conversion into halide compounds, then a catechol and a diol, which are dissolved in a solvent in the presence of an acid acceptor such as pyridine, are added dropwise, and reaction is allowed to take place at room temperature or under heating, whereby a desired polyester can be obtained easily. The feed ratio of the monomers is the same as in the foregoing melt polymerization process. That is, it is established so that 0.05 to 15 mol %, preferably 0.10 to 7.5 mol %, particularly preferably 0.20 to 5 mol %, of a trimesic acid derivative (a structural unit (A) forming monomer) and 5 to 60 mol %, preferably 7 to 60 mol %, of a catechol (a structural unit (B) forming monomer) are contained in the polyester. Also as to the other optional components—dicarboxylic acid (a dicarboxylic acid structural unit forming monomer), diol (a diol structural unit forming monomer), and hydroxycarboxylic acid (a hydroxycarboxylic acid structural unit forming monomer)—, their feed ratio is established so that:

① the ratio of the total number of functional groups contained in the diol and catechol structural units to the total number of functional groups contained in the monocarboxylic, dicarboxylic and trimesic acid structural units is in the range of 0.90 to 1.20, preferably 0.95 to 1.10, particularly preferably 1.00 to 1.05;

② the proportion of trimesic acid structural units in the total dicarboxylic and trimesic acid structural units is usually in the range of 0.5 to 30 mol %, preferably 1.0 to 15 mol %, particularly preferably 2.0 to 10 mol %;

③ the proportion of catechol structural units in the total catechol and diol structural units is usually in the range of 30 to 100 mol %, preferably 40 to 100 mol %; and ④ the proportion of hydroxycarboxylic acid structural units in the total structural units is usually in the range of 0 to 60 mol %, preferably 0 to 50 mol %, particularly preferably 0 to 40 mol %.

The solvent to be used in the solution polymerization is not specially limited. As examples are mentioned halogen solvents such as o-dichlorobenzene, dichloroethane, and tetrachloroethane, polar solvents such as dimethyl sulfoxide (DMSO), dimethylformamide (DMF), and N-methylpyrrolidone (NMP), and ether solvents such as tetrahydrofuran (THF) and dioxane. The acid acceptor is not specially limited, either, examples of which include triethylamine and tripropylamine.

Reaction conditions for the solution polymerization are not specially limited, but involve a temperature of usually 50° to 200° C., preferably 60° to 150° C., and a reaction time of usually not shorter than 1 hour, preferably 2 to 10 hours.

The liquid crystalline polyester thus prepared usually can form a nematic or smectic phase in the state of liquid crystal.

Moreover, when the liquid crystalline polyester is cooled at an arbitrary cooling speed in the state of liquid crystal, a phase transfer to a crystal phase does not occur substantially. In the state of liquid crystal the polyester exhibits for example, a nematic or smectic phase, which oriented state can be fixed easily by cooling. In fixing a nematic phase stably, when viewed from the standpoint of crystal phase series, if a crystal phase is present in a lower temperature zone than the nematic phase, there inevitably occurs a passage through the crystal phase at the time cooling for the fixing, with consequent destruction of the nematic orientation once formed. The liquid crystalline polyesters employable in the present invention essentially exhibits an nematic or smectic phase in the state of liquid crystal and exhibit on glass state at a temperature lower than the liquid crystal transition temperature. Thus, it is characterized that the molecular orientation state at the state of liquid crystal, more particularly nematic orientation state (or smectic orientation state) can remain as it is. By utilizing the above properties of the liquid crystalline polyester without any optically active component a novel optical film can be prepared. If necessary, an optically active component may be incorporated in the liquid crystalline polyester to obtain a liquid crystalline substance which makes a twisted nematic (or smectic) orientation which can be used for preparing a novel optical film.

Hereinafter, the optically active component which is incorporated into the liquid crystalline polyester to provide the polyester with twist to form a twisted nematic orientation having a desirable twist angle is explained. The optically active compound is not specially limited but optically active liquid crystalline compounds are preferably used in view of the compatibility with the above nematic liquid crystalline polyester and the like.

The following are preferable compounds. (In the formulae, The mark * shows optically active carbon.)

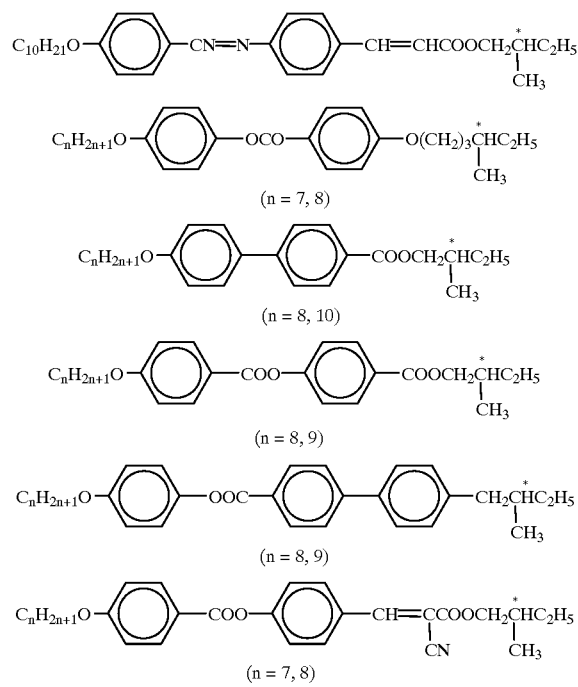

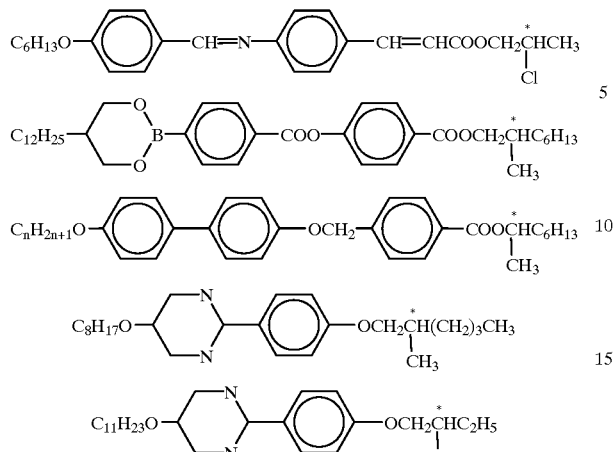

and cholesterol derivatives.

Optically active polymers can also be used as the optically active compound.

The optically active polymer is not specially limited but optically active liquid crystalline polymers are preferably used in view of the compatibility with the above nematic liquid crystalline polyester and the like. As the polymers, those having optically active group(s), such as liquid crystalline polymethacylates, polymalonates, polysiloxanes, polyarylates, polyesters, polyamides, polyesteramides, polycarbonates, polypeptides, celluloses and the like are preferably used. Among them, optically active liquid crystalline aromatic based polyesters are most preferably used in the present invention in view of compatibility and the like. Examples of preferable polyesters are as follows.

(Structural formula 18)

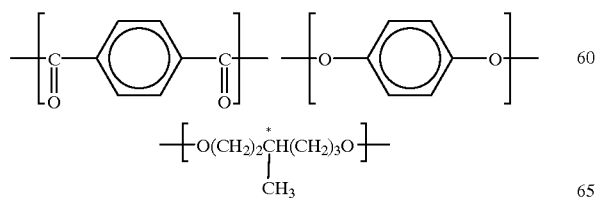

Polymer consisting essentially of the structural units:

(Structural formula 19)

Polymer consisting essentially of the structural units;

(Structural formula 20)

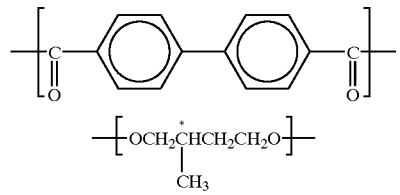

Polymer consisting essentially of the structural units;

(Structural formula 21)

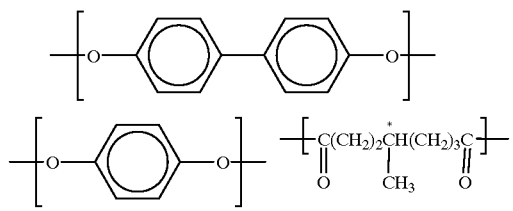

Polymer consisting essentially of the structural units;

(Structural formula 22)

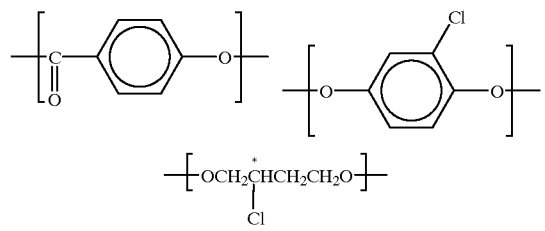

Polymer consisting essentially of the structural units;

(Structural formula 23)

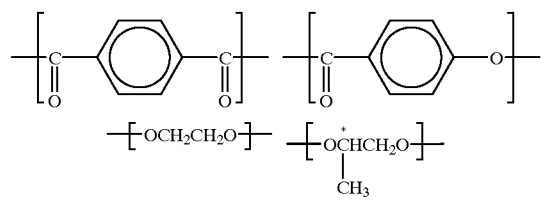

Polymer consisting essentially of the structural units;

(Structural formula 24)

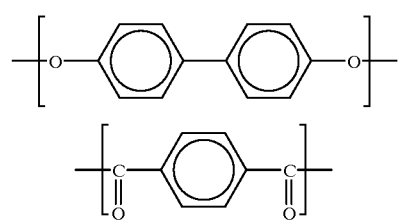

-continued

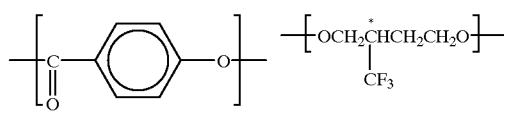

Polymer consisting essentially of the structural units;

(Structural formula 25)

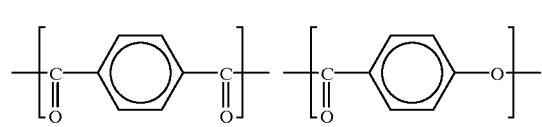

Polymer consisting essentially of the structural units;

(Structural formula 26)

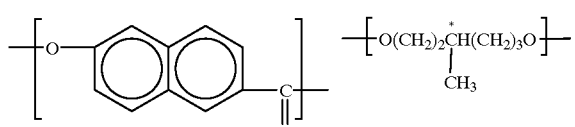

Polymer consisting essentially of the structural units;

(Structural formula )

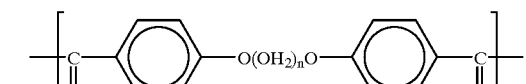
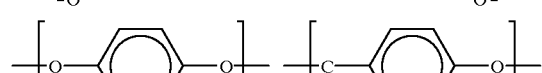
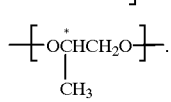

Polymer consisting essentially of the structural units;

(Structural formula 28)

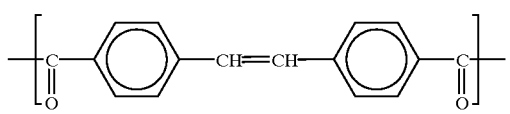
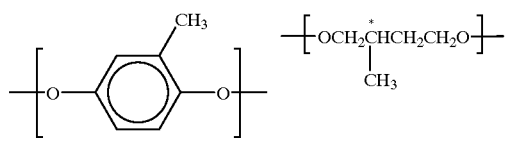

Polymer consisting essentially of the structural units;

(Structural formula 29)

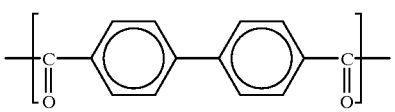
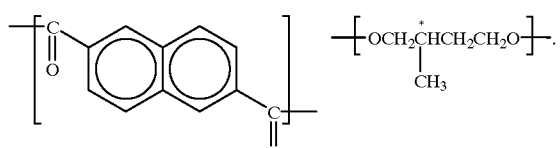

Polymer consisting essentially of the structural units;

(Structural formula 30)

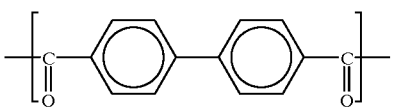
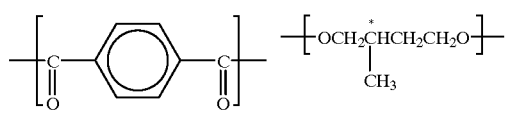

Polymer consisting essentially of the structural units;

(Structural formula 31)

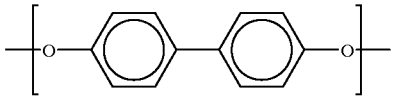
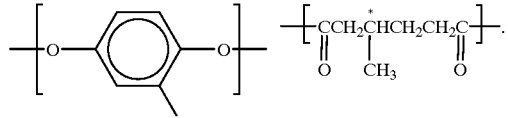

Polymer consisting essentially of the structural units;

(Structural formula 32)

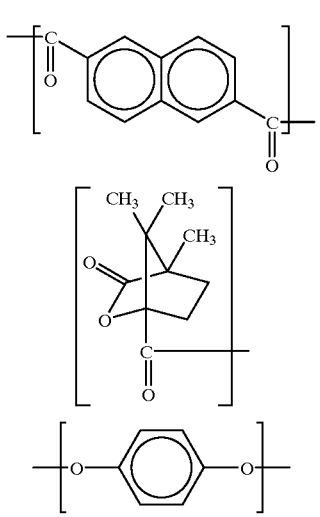

Polymer consisting essentially of the structural units;

(Structural formula 33)

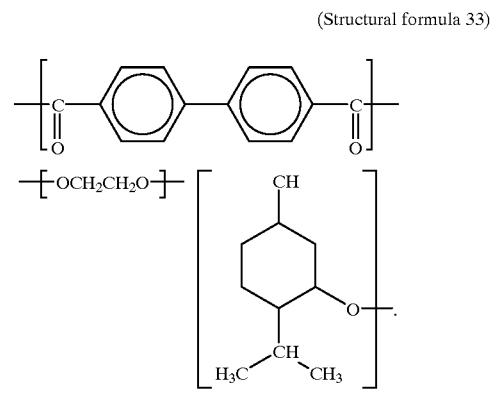

Polymer consisting essentially of the structural units;

(Structural formula 34)

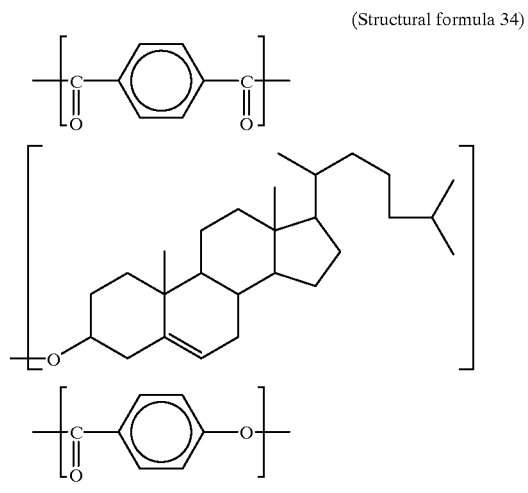

Polymer consisting essentially of the structural units;

(Structural formula 35)

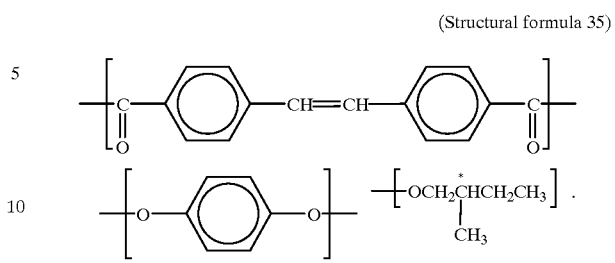

Polymer consisting essentially of the structural units;

The above optically active liquid polyesters may be formed from structural units suitably selected from a structural unit derived from the above monocarboxylic acids (hereinafter, referred to as monocarboxylic acid structural unit (a)), a structural unit derived from the dicarboxylic acids (dicarboxylic acid structural unit (b)), a structural unit derived from the monools (monool structural unit (c)), a structural unit derived from the diols (diol structural unit (d)) and a structural unit derived from the hydroxycarboxylic acids which each is a compound having a carboxylic acid group, and a hydroxy group in one structural unit (hydroxycarboxylic acid unit (e)).

The preparation method for the above optically active liquid crystalline polyester is not specially limited. It can be prepared by a known process such as a meet polymerization process or a solution polymerization process. The content of the optically active group in the polyester is usually 0.5 to 80 mol %, preferably 5 to 60 mol %.

The molecular weight is usually in the range of 0.05 to 3.0 dl/g, preferably 0.07 to 2.0 dl/g, in terms of an inherent viscosity as determined in a mixed phenol/tetrachloroethane solvent (weight ratio: 60/40) at 30° C. If the inherent viscosity is less than 0.05 dl/g, the control. of polymerization temperature is difficult and if it is higher than 3.0 dl/g, the melt viscosity becomes too high and it takes a much time to appear a liquid crystal.

In the present invention any composition comprising the above optically active liquid crystalline polyester and the above nematic liquid crystalline polyester can be provided as the substance of the present invention.

Examples of such compositions are as follows:

(Structural formula 36)

(A)

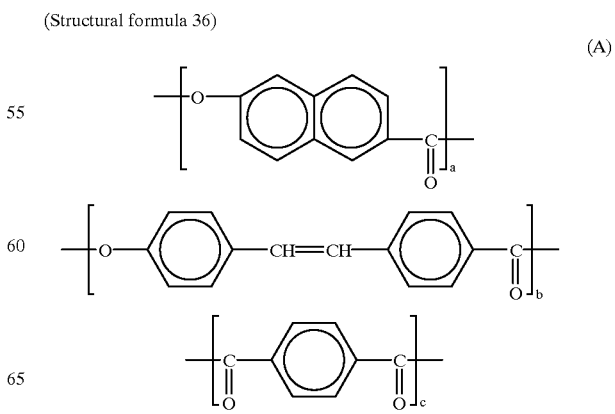

-continued

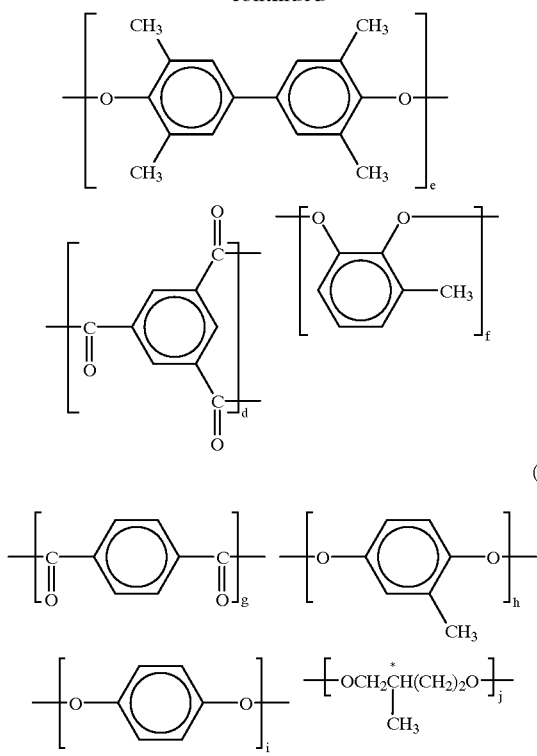

(B)

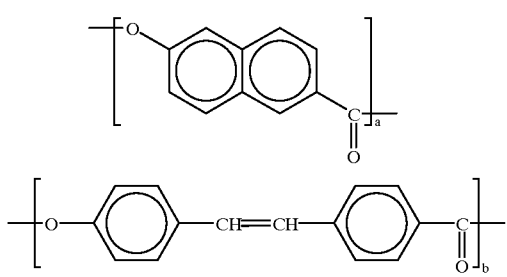

composition of (A) and (B) ((B)/(A)=0.001–0.50, preferably 0.05–0.30 (weight ratio))

(2e+2f)/(2c+3d)=0.90–1.20, preferably 0.95–1.10, more preferably 1.00–1.05 d/(c+d)=0.005–0.30, preferably 0.01–0.15, more preferably 0.02–0.10 a/b 100/0–0/100

(a+b)/(a+b+c+d+e+f)=0–0.6 f/(e+f)=0.1–1.0

(h+i+j)/g=0.90–1.20, preferably 0.95–1.10, more preferably 1.00–1.05 j/(g+h+i+j)=0.005–0.80, preferably 0.05–0.60

(a, b, c, d, e, f, g, h, i and j show each a mole composition ratio).

(Structural formula 37)

(A)

-continued

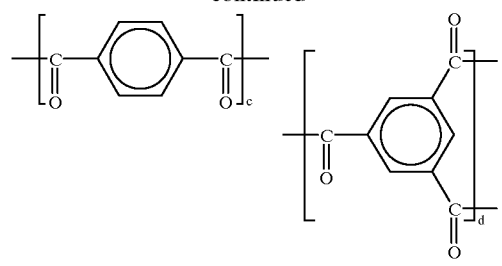

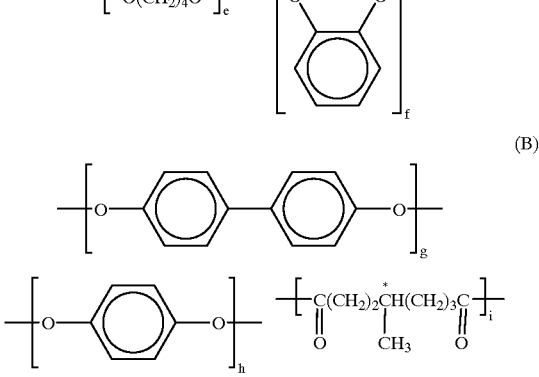

(B)

composition of (A) and (B) ((B)/(A)=0.001–0.50, preferably 0.05–0.30 (weight ratio))

(2e+2f)/(2c+3d)=0.90–1.20, preferably 0.95–1.10, more preferably 1.00–1.05 d/(c+d)=0.005–0.30, preferably 0.01–0.15, more preferably 0.02–10 a/b=100/0–0/100

(a+b)/(a+b+c+d+e+f)=0–0.6 f/(e+f)=0.1–1.0

(g+h)/i=0.90–1.20, preferably 0.95–1.10, more preferably 1.00–1.05 i/(g+h+i)=0.005–0.80, preferably 0.05–0.60

(a, b, c, d, e, f, g, h, i and j show each a mole composition ratio).

(Structural formula 38)

(A)

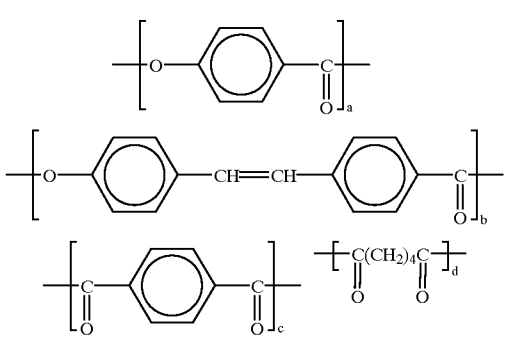

-continued

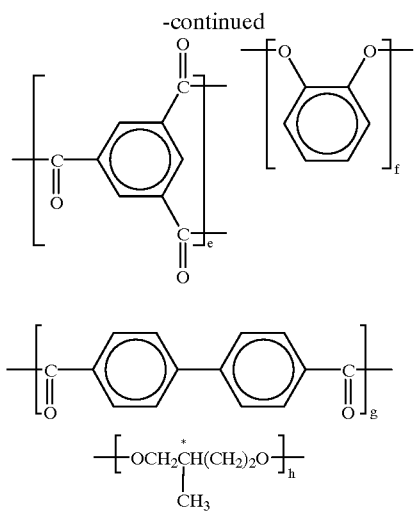

(B)

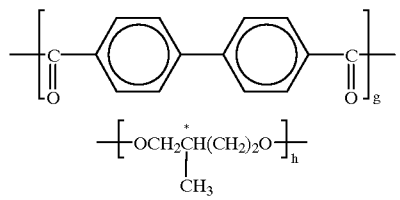

composition of (A) and (B) ((B)/(A)=0.001–0.50, preferably 0.05–0.30 (weight ratio))

2f/(2c+2d+3e)=0.90–1.20, preferably 0.95–1.10, more preferably 1.00–1.05 e/(c+d+e)=0.005–0.30, preferably 0.01–0.15, more preferably 0.02–0.10 a/b=100/0–0/100

(a+b)/(a+b+c+d+e+f)=0–0.6 h/g=0.90–1.20, preferably 0.95–1.10, more preferably 1.00–1.05

(a, b, c, d, e, f, g and h show each a mole composition ratio).

(Structural formula 39)

(A)

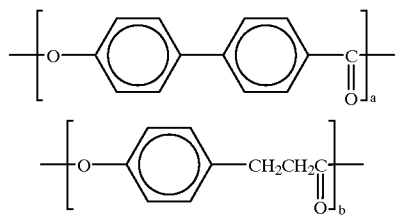

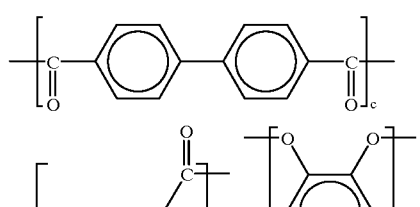

(B)

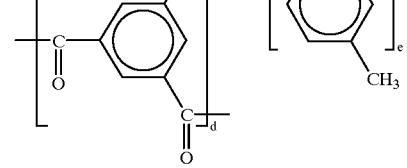

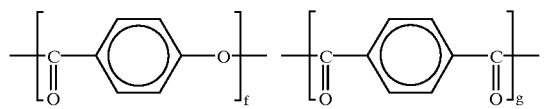

-continued

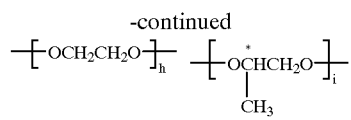

composition of (A) and (B) ((B)/(A)=0.001–0.50, preferably 0.005–0.30 (weight ratio))

2e/(2c+3d)=0.90–1.20, preferably 0.95–1.10, more preferably 1.00–1.05 d/(c+d)=0.005–0.30, preferably 0.01–0.15, more preferably 0.02–0.10 a/b=100/0–0/100

(a+b)/(a+b+c+d+e+f)=0–0.6

(h+i)/g=0.90–1.20, preferably 0.95–1.10, more preferably 1.00–1.05 i/(f+g+h+i)=0.005–0.80, preferably 0.05–0.60

(a, b, c, d, e, f, g, h and i show each a mole composition ratio).

(Structural formula 40)

(A)

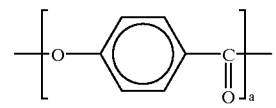

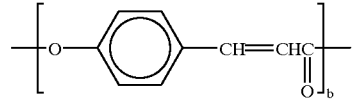

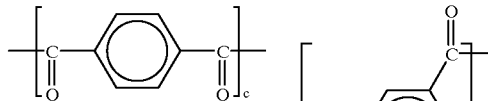

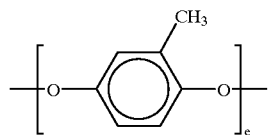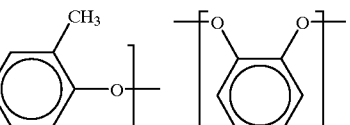

(B)

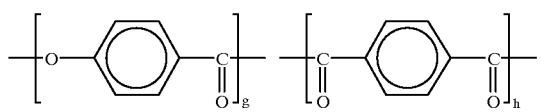

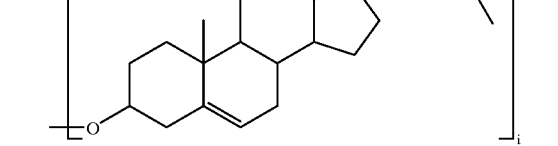

composition of (A) and (B) ((B)/(A)=0.001–0.50, preferably 0.005–0.30 (weight ratio))

(2e+2f)/(2c+3d)=0.90–1.20, preferably 0.95–1.10, more preferably 1.00–1.05

$d/(c+d)=0.005–0.30$, preferably 0.01–0.15, more preferably 0.02–0.10

$a/b=100/0–0/100$ $(a+b)/(a+b+c+d+e+f)=0–0.6$ $f/(e+f)=0.1–1.0$ $i/2h=0.90–1.20$, preferably 0.95–1.10, more preferably 1.00–1.05

$i/(g+h+i)=0.005–0.80$, preferably 0.05–0.60

(a, b, c, d, e, f, g, h and i show each a mole composition ratio).

(Structural formula 41)

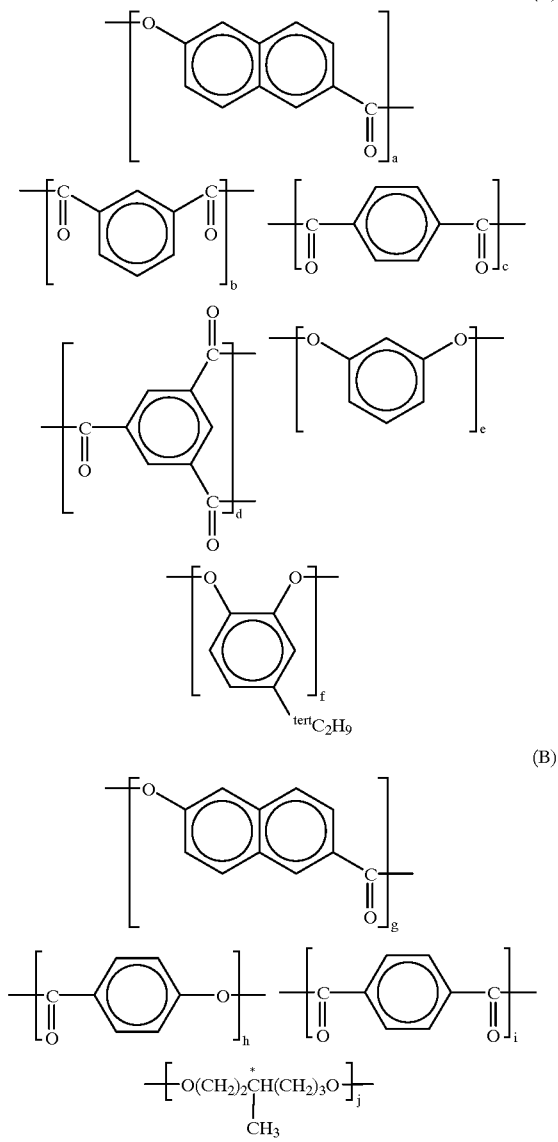

(A)

(B)

composition of (A) and (B) ((B)/(A)=0.001–0.50, preferably 0.05–0.30 (weight ratio))

$(2e+2f)/(2b+2c+3d)=0.90–1.20$, preferably 0.95–1.10, more preferably 1.00–1.05

$d/(b+c+d)=0.005–0.30$, preferably 0.01–0.15, more preferably 0.02–0.10

$a/(a+b+c+d+e+f)=0–0.6$ $f/(e+f)=0.1–1.0$ $j/i=0.90–1.20$, preferably 0.95–1.10, more preferably 1.00–1.05

$j/(g+h+i+j)=0.005–0.80$, preferably 0.05–0.60

(a, b, c, d, e, f, g and h show each a mole composition ratio).

(Structural formula 42)

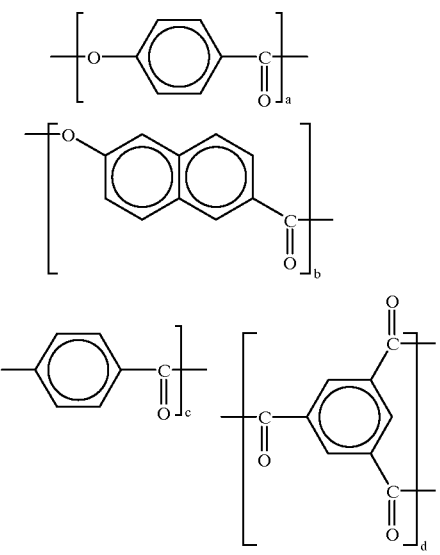

(A)

(B)

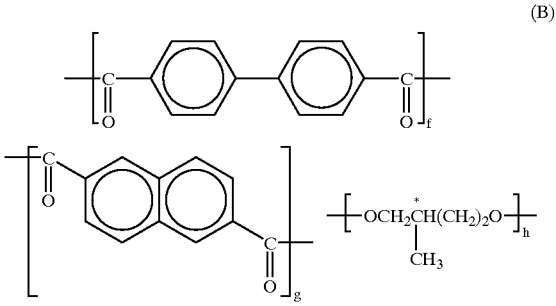

composition of (A) and (B) ((B)/(A)=0.001–0.50, preferably 0.05–0.30 (weight ratio))

$2e/(2c+3d)=0.90–1.20$, preferably 0.95–1.10, more preferably 1.00–1.05

$d/(c+d)=0.005–0.30$, preferably 0.01–0.15, more preferably 0.02–0.10

$a/b=100/0–0/100$ $(a+b)/(a+b+c+d+e)=0–0.6$ $h/(f+g)=0.90–1.20$, preferably 0.95–1.10, more preferably 1.00–1.05

$h/(f+g+h)=0.005–0.80$, preferably 0.05–0.60

(a, b, c, d, e, f, g and h show each a mole composition ratio).

(Structural formula 43)

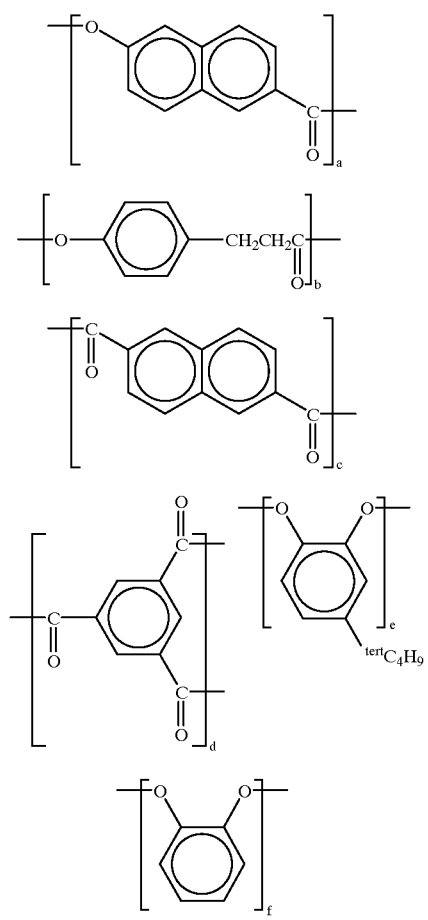

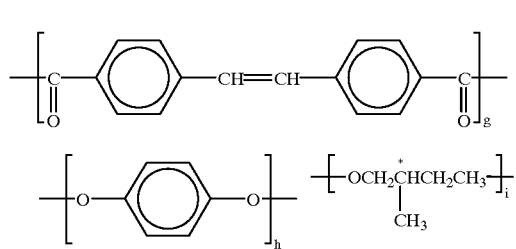

composition of (A) and (B) ((B)/(A)=0.001–0.50, preferably 0.05–0.30 (weight ratio))

(2e+2f)/(2c+3d)=0.90–1.20, preferably 0.95–1.10, more preferably 1.00–1.05 d/(c+d)=0.005–0.30, preferably 0.01–0.15, more preferably 0.02–0.10 a/b=100/0–0/100

(a+b)/(a+b+c+d+e)=0–0.6

(2h+i)/2g=0.90–1.20, preferably 0.95–1.10, more preferably 1.00–1.05 i/(g+h+i)=0.005–0.80, preferably 0.05–0.60

(a, b, c, d, e, f, g, h and i show each a mole composition ratio).

(Structural formula 44)

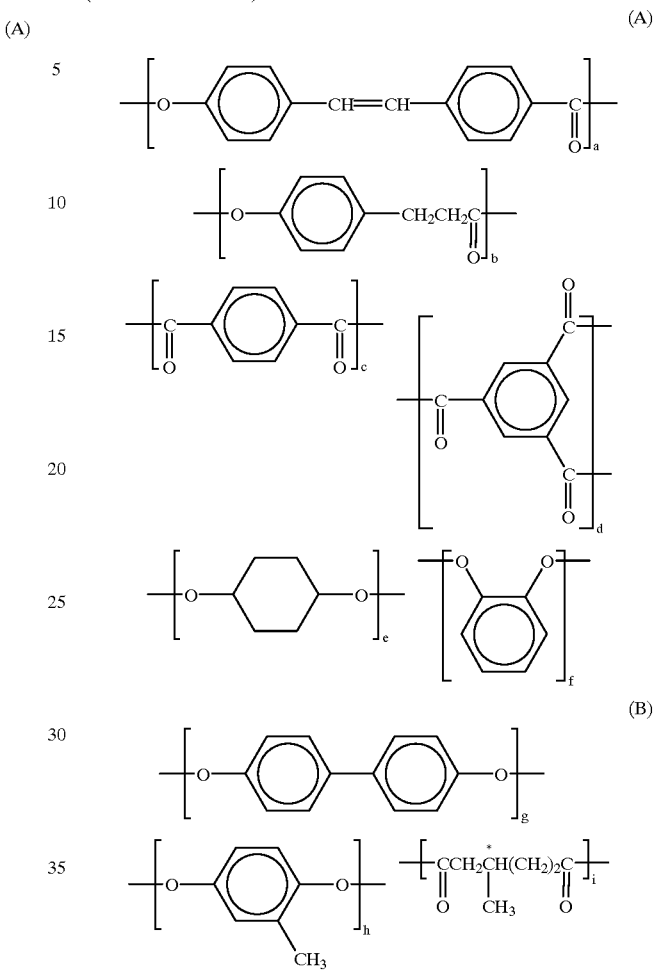

composition of (A) and (B) ((B)/(A)=0.001–0.50, preferably 0.05–0.30 (weight ratio))

(2e+2f)/(2c+3d) 0.90–1.20, preferably 0.95–1.10, more preferably 1.00–1.05 d/(c+d)=0.005–0.30, preferably 0.01–0.15, more preferably 0.02–0.10 a/b=100/0–0/100

(a+b)/(a+b+c+d+e+f)=0–0.6 f/(e+f)=0.1–1.0

(g+h)/i=0.90–1.20, preferably 0.95–1.10, more preferably 1.00–1.05 i/(g+h+i)=0.005–0.80, preferably 0.05–0.60

(a, b, c, d, e, f, g, h and i show each a mole composition ratio).

The composition of the nematic liquid crystalline polyester and the optically active compound can be prepared by various mixing method such as solid mixing, solution mixing or meet mixing with predetermined amounts thereof. The proportion of the optically active compound in the composition varied depending on the proportion of optically active groups in the compound or the twisting power of the optically active compound which give uniform twisted nematic orientation of monodamain and which oriented state can be fixed easily. These polyesters have the structural units (A) and (B) as essential structural units together with unit such as monool, diol, monocanbexylic acid, dicarboxylic acid and/or hydroxycarboxylic acid which has optically active group(s) as exemplified below. (The mark means optically active carbon.)

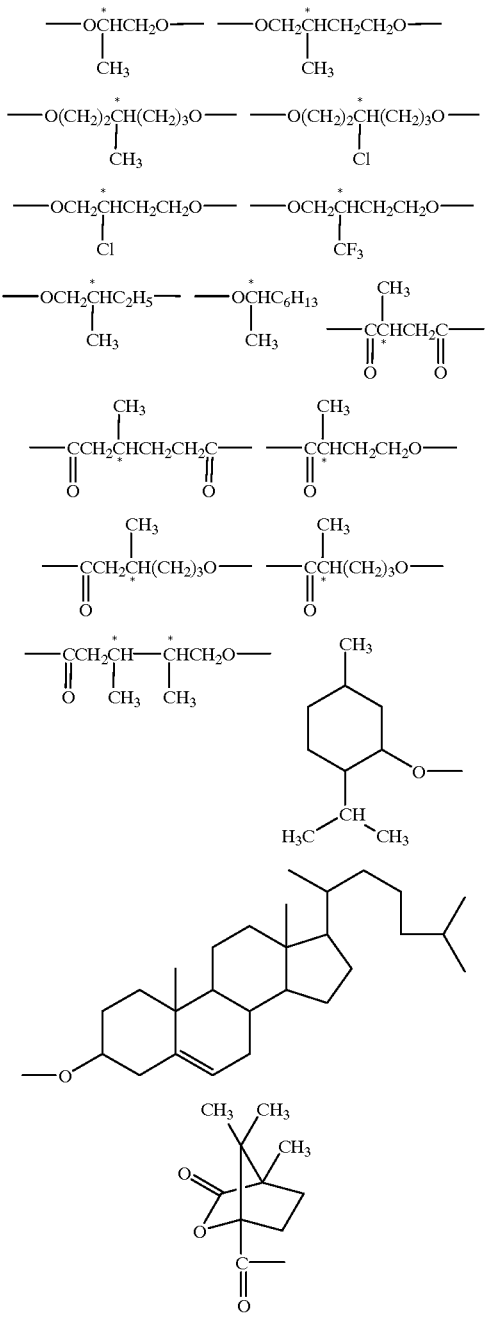

Examples of the liquid crystalline polyesters having optically active group containing structural units and structural units (A) and (B) as essential structural units are as follows:

(Structural formula 45)

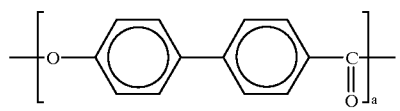

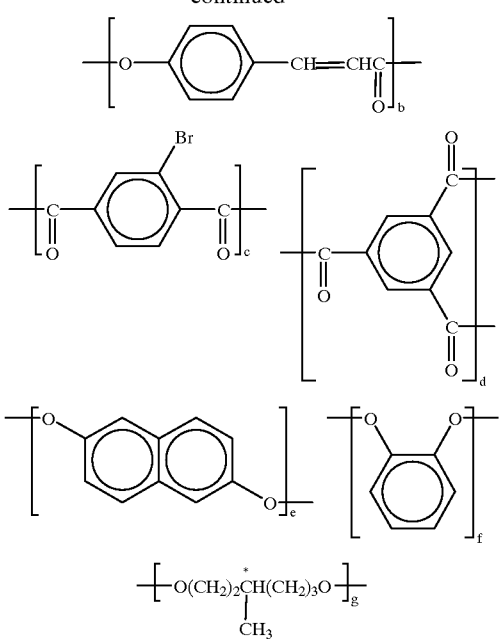

$(2e+2f+2g)/(2c+3d)$ 0.90–1.20, preferably 0.95–1.10, more preferably 1.00–1.05

$d/(c+d)=0.005–0.30$, preferably 0.01–0.15, more preferably 0.02–0.10

$g/(a+b+c+d+e+f+g)=0.001–0.30$, preferably 0.005–0.20

$a/b=100/0–0/100$ $(a+b)/(a+b+c+d+e+f+g)=0–0.6$ (a, b, c, d, e, f and g show each a mole composition ratio).

(Structural formula 46)

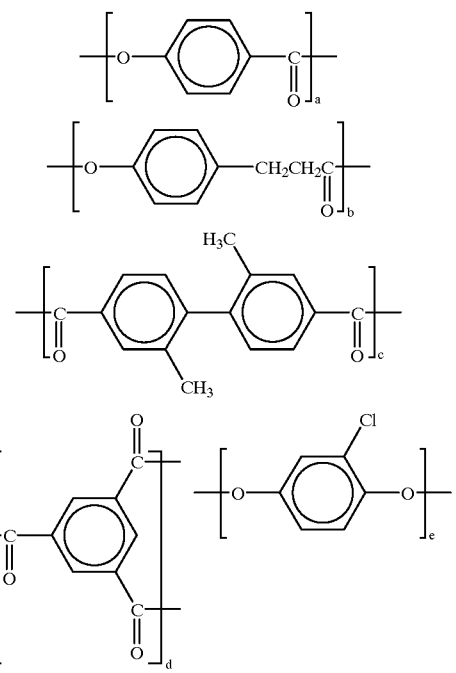

-continued

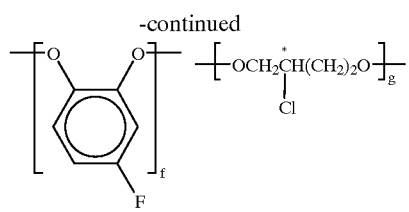

(2e+2f+2g)/(2c+3d)=0.90–1.20, preferably 0.95–1.10, more preferably 1.00–1.05 d/(c+d)=0.005–0.30, preferably 0.01–0.15, more preferably 0.02–0.10 g/(a+b+c+d+e+f+g)=0.001–0.30, preferably 0.005–0.20 a/b=100/0–0/100

(a+b)/(a+b+c+d+e+f+g)=0–0.6

(a, b, c, d, e, f and g show each a mole composition ratio).

(Structural formula 47)

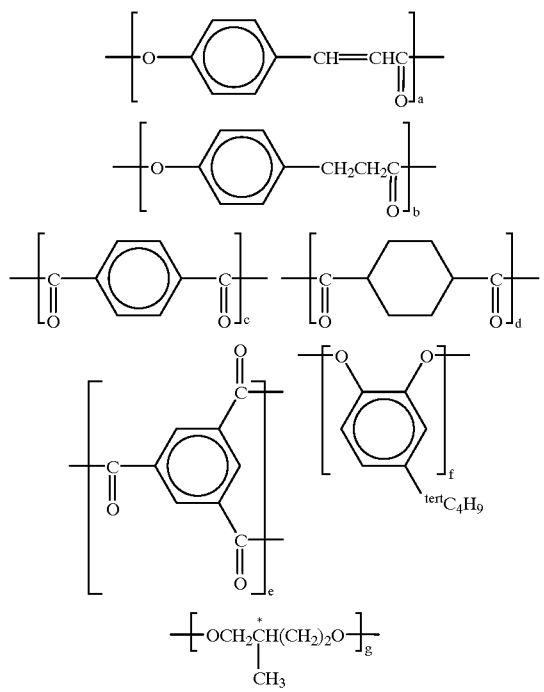

(2f+2g)/(2c+2d+3e)=0.90–1.20, preferably 0.95–1.10, more preferably 1.00–1.05 e/(c+d+e)=0.005–0.30, preferably 0.01–0.15, more preferably 0.02–0.10 g/(a+b+c+d+e+f+g)=0.001–0.30, preferably 0.005–0.20 a/b=100/0–0/100

(a+b)/(a+b+c+d+e+f+g)=0–0.6

(a, b, c, d, e, f and g show each a mole composition ratio).

(Structural formula 48)

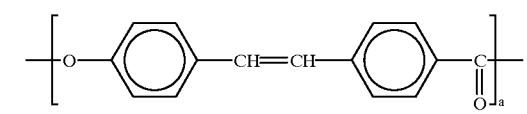

-continued

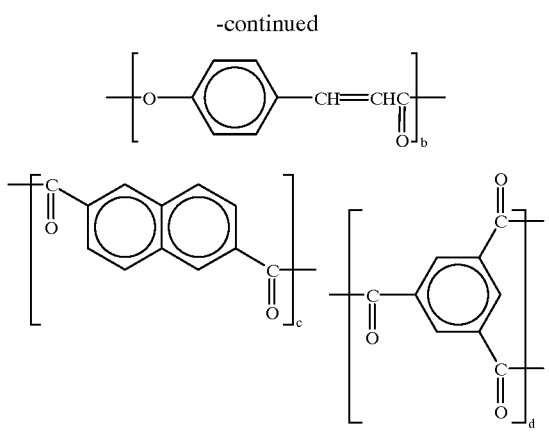

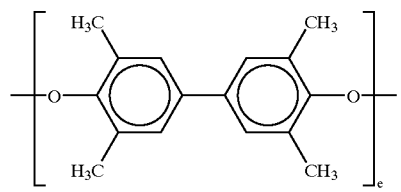

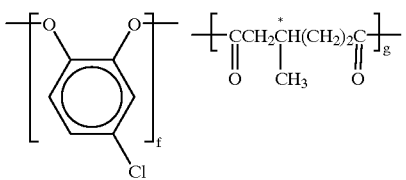

(2e+2f)/(2c+3d+2g)=0.90–1.20, preferably 0.95–1.10, more preferably 1.00–1.05 d/(c+d+g)=0.005–0.30, preferably 0.01–0.15, more preferably 0.02–0.10 g/(a+b+c+d+e+f+g)=0.001–0.30, preferably 0.005–0.20

(a+b)/(a+b+c+d+e+f+g)=0–0.6

(a, b, c, d, e, f and g show each a mole composition ratio).

(Structural formula 49)

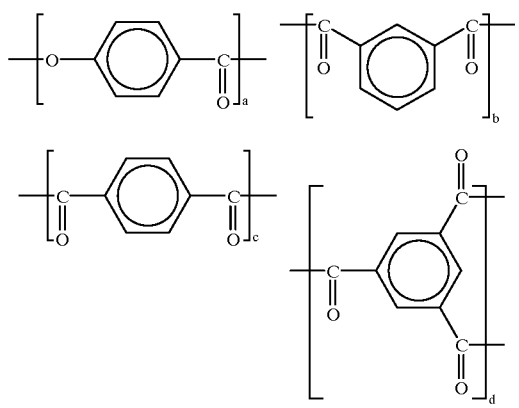

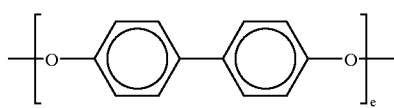

-continued

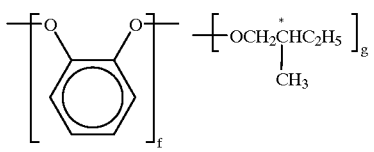

(2e+2f+g)/(2b+2c+3d)=0.90–1.20, preferably 0.95–1.10, more preferably 1.00–1.05 d/(b+c+d)=0.005–0.30, preferably 0.01–0.15, more preferably 0.02–0.10 g/(a+b+c+d+e+f+g)=0.001–0.30, preferably 0.005–0.20 a/b=100/0–0/100

(a+b)/(a+b+c+d+e+f+g)=0–0.6

(a, b, c, d, e, f and g show each a mole composition ratio).

(Structural formula 50)

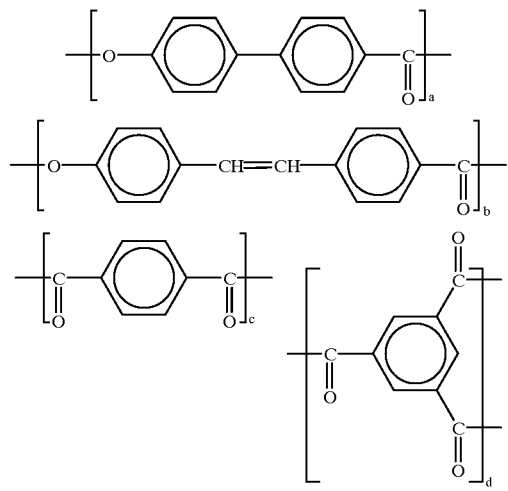

(2e+2f+2g)/(2c+3d)=0.90–1.20, preferably 0.95–1.10, more preferably 1.00–1.05 d/(c+d)=0.005–0.03, preferably 0.01–0.15, more preferably 0.02–0.10 g/(a+b+c+d+e+f+g)=0.001–0.30, preferably 0.005–0.20 a/b=100/0–0/100

(a+b)/(a+b+c+d+e+f+g)=0–0.6

(a, b, c, d, e, f and g show each a mole composition ratio).

(Structural formula 51)

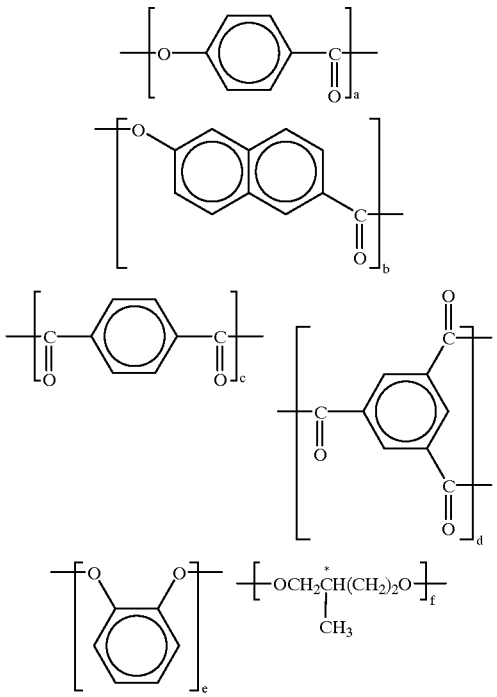

(2e+2f)/(2c+3d)=0.90–1.20, preferably 0.95–1.10, more preferably 1.00–1.05 d/(c+d)=0.005–0.30, preferably 0.01–0.15, more preferably 0.02–0.10 f/(a+b+c+d+e+f)=0.001–0.30, preferably 0.005–0.20 a/b=100/0–0/100

(a+b)/(a+b+c+d+e+f)=0–0.6

(a, b, c, d, e and f show each a mole composition ratio).

(Structural formula 52)

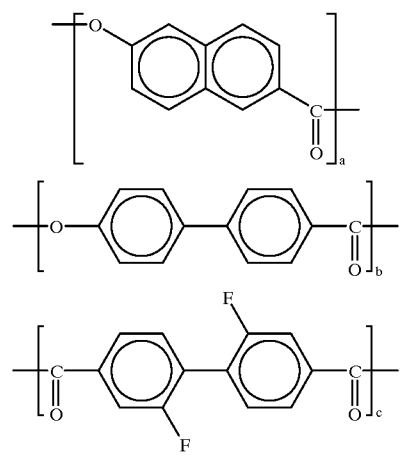

-continued

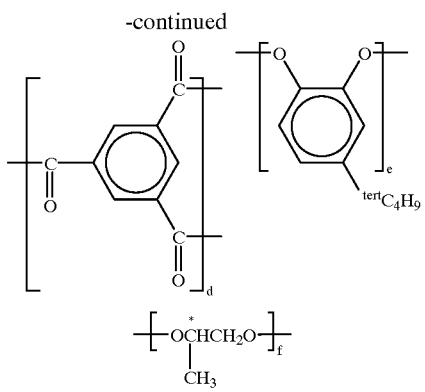

(2e+2f)/(2c+3d)=0.90–1.20, preferably 0.95–1.10, more preferably 1.00–1.05 d/(c+d)=0.005–0.30, preferably 0.01–0.15, more preferably 0.02–0.10 f/(a+b+c+d+e+f)=0.001–0.30, preferably 0.005–0.20 a/b=100/0–0/100

(a+b)/(a+b+c+d+e+f)=0–0.6

(a, b, c, d, e and f show each a mole composition ratio).

The proportions of the above structural units which constitute liquid crystalline polyesters cannot be said sweepingly because their optimum values differ depending on the construction concerned. Usually, the ratio of the total number of functional groups contained in the structural nits of monool, diol and catechol and the total number of functional groups contained in the structural units of monocarboxylic acid, dicarboxylic acid and trimesic acid is in the range of 0.90 to 1.20, preferably 0.95 to 1.10, more preferably 1.00 to 1.05. The proportion of the trimesic acid structural units in the total structural units of monocarboxylic acid, dicarboxylic acid and trimesic acid is usually in the range of 0.5 to 30 mol %, preferably 1.0 to 15 mol %, more preferably 2.0 to 10 mol %. The proportion of the catechol structural units in the total structural units of catechol, diol and monool is usually in the range of 30 to 100 mol %, preferably 40 to 100 mol %. The proportion of the hydroxycarboxylic acid structural units in the total structural units is in the range of 0 to 60 mol %, preferably 0 to 50 mol %, more preferably 0 to 40 mol %. Further, the proportion of optically active groups in the liquid crystalline polyester used is usually in the range of 0.1 to 30 mol %, preferably 0.5 to 20 mol %. If the proportion of optically active groups is less than 0.1 mol %, it may be impossible to obtain a twisted nematic orientation, and if it is more than 30 mol %, the orientation holding ability may be deteriorated.

Like the nematic liquid crystalline polyester described previously, the above twisted nematic liquid crystalline polyester can be prepared by a polymerization process known in the field concerned, e.g., a melt polymerization process or a solution polymerization process.

According to the melt polymerization process, predetermined amounts of trimesic acid (a structural unit (A) forming monomer), an acetylated compound of catechol (a structural unit (B) forming monomer), an optically active group-containing monomer such as diol, dicarboxylic acid, monool, or monocarboxylic acid, as well as, optionally, a dicarboxylic acid (a dicarboxylic acid structural unit forming monomer), an acetylated compound of diol (a diol structural unit forming monomer), and an acetylated compound of a hydroxycarboxylic acid (a hydroxycarboxylic acid structural unit forming monomer), are copolymerized at a high temperature and under atmospheric or reduced pressure or under a high vacuum, whereby there can be obtained a desired twisted nematic liquid crystalline polyester easily.

A feed ratio of monomers which form the respective structural units is set in such a manner that, as described above, 0.05 to 15 mol %, more preferably 0.10 to 7.5 mol %, particularly preferably 0.20 to 5 mol %, of trimesic acid (a structural unit (A) forming monomer), 4.5 to 60 mol %, preferably 6 to 60 mol %, of catechol (a structural unit (B) forming monomer), usually 0.1 to 30 mol %, preferably 0.5 to 20 mol %, of an optically active group-containing monomer (e.g., an optically active diol, an optically active dicarboxylic acid, an optically active monool, or an optically active monocarboxylic acid), are contained in the polyester concerned. Also as to the other optional components—dicarboxylic acid (a dicarboxylic acid structural unit forming monomer), diol (a diol structural unit forming monomer), and hydroxycarboxylic acid (a hydroxycarboxylic acid structural unit forming monomer)—, an appropriate feed ratio is established so that:

① the ratio of the total number of functional groups contained in the monool, diol and catechol structural units and the total number of functional groups contained in the monocarboxylic, dicarboxylic and trimesic acid structural units is in the range of 0.90 to 1.20, preferably 0.95 to 1.10, particularly preferably 1.00 to 1.05;

② the proportion of trimesic acid structural units in the total structural units of monocarboxylic, dicarboxylic and trimesic acids is usually in the range of 0.5 to 30 mol %, preferably 1.0 to 15 mol %, particularly preferably 2.0 to 10 mol %;

③ the proportion of catechol structural units in the total catechol, monool and diol structural units is usually in the range of 30 to 100 mol %, preferably 40 to 100 mol %;

④ the proportion of hydroxycarboxylic acid structural units in the total structural units is usually in the range of 0 to 60 mol %, preferably 0 to 50 mol %, particularly preferably 0 to 40 mol %.

Polymerization conditions are not specially limited, but usually involve a temperature of 150° to 350° C., preferably 200° to 300° C., and a reaction time of 30 minutes or more, preferably 1 to 20 hours. For accelerating the polyerization reaction there may be used amines such as 1-methylimidazole and 4-dimethylaminopyridine, as well as metallic salts of metals such as alkali metals, Fe, Mn, Ti, Co, Sb, and Sn, each alone or in combination. For the purpose of diminishing coloration of the polyester there may be used various antioxidants. Further, the molecular weight of the polyester can be adjusted easily as in the ordinary condensation reaction, for example, by controlling the polymerization time.

The molecular weight of the liquid crystalline polyester is usually in the range of 0.04 to 0.4 dl/g, preferably 0.06 to 0.3 dl/g, particularly preferably 0.1 to 0.25 dl/g, in terms of an inherent viscosity as determined in a mixed phenol/tetrachloroethane solvent (weight ratio: 60/40) at 30° C. If the inherent viscosity is less than 0.05 dl/g, the strength of film formed from the polyester will be low, and if it is more than 0.4 dl/g, the viscosity will be high in the formation of liquid crystal, with consequent deterioration of orientability and increase of the time required for orientation. Thus, both such cases are not desirable.

In preparing a liquid crystalline polyester for use in the present invention in accordance with the solution polymerization process, for example, predetermined amounts of trimesic acid (a structural unit (A) forming monomer), a dicarboxylic acid (a dicarboxylic acid structural unit forming monomer), and a hydroxycarboxylic acid (a hydroxycarboxylic acid structural unit forming monomer) are subjected to the action of a chlorinating agent such as thionyl chloride for conversion into halide compounds, then a catechol and a diol, which are dissolved in a solvent in the presence of an acid acceptor such as pyridine, are added dropwise, and reaction is allowed to take place at room temperature or under heating, whereby a desired polyester can be obtained easily. The feed ratio of the monomers is the same as in the foregoing melt polymerization process. That is, it is established so that 0.05 to 15 mol %, preferably 0.10 to 7.5 mol %, particularly preferably 0.20 to 5 mol %, of a trimesic acid derivative (a structural unit (A) forming monomer), 4.5 to 60 mol %, preferably 6 to 60 mol %, of a catechol (a structural unit (B) forming monomer), and usually 0.1 to 30 mol %, preferably 0.5 to 20 mol %, of an optically active group-containing monomer (e.g., an optically active diol, an optically active dicarboxylic acid halide, an optically active monocarboxylic acid halide, or an optically active monool), are contained in the polyester. Also as to the other optional components—dicarboxylic acid (a dicarboxylic acid structural unit forming monomer), diol (a diol structural unit forming monomer), and hydroxycarboxylic acid (a hydroxycarboxylic acid structural unit forming monomer)—, their feed ratio is established so that:

① the ratio of the total number of functional groups contained in the monool, diol and catechol structural units and the total number of functional groups contained in the monocarboxylic, dicarboxylic and trimesic acid structural units is in the range of 0.90 to 1.20, preferably 0.95 to 1.10, particularly preferably 1.00 to 1.05;

② the proportion of trimesic acid structural units in the total monocarboxylic, dicarboxylic and trimesic acid structural units is usually in the range of 0.5 to 30 mol %, preferably 1.0 to 15 mol %, particularly preferably 2.0 to 10 mol %;

③ the proportion of catechol structural units in the total catechol, monool and diol structural units is usually in the range of 30 to 100 mol %, preferably 40 to 100 mol %; and ④ the proportion of hydroxycarboxylic acid structural units in the total structural units is usually in the range of 0 to 60 mol %, preferably 0 to 50 mol %, particularly preferably 0 to 40 mol %.

The solvent to be used in the solution polymerization is not specially limited. As examples are mentioned halogen solvents such as o-dichlorobenzene, dichloroethane, and tetrachloroethane, polar solvents such as dimethyl sulfoxide (DMSO), dimethylformamide (DMF), and N-methylpyrrolidone (NMP), and ether solvents such as tetrahydrofuran (THF) and dioxane. The acid acceptor is not specially limited, either, examples of which include triethylamine and tripropylamine.

Reaction conditions for the solution polymerization are not specially limited, but involve a temperature of usually 50° to 200° C., preferably 60° to 150° C., and a reaction time of usually not shorter than 1 hour, preferably 2 to 10 hours.

The liquid crystalline polyester thus prepared exhibits itself a uniform twisted nematic orientation of monodomain in the state of liquid crystal, which oriented state can be fixed easily. If necessary, an optically active low- or high-molecular compound described above may be incorporated in the twisted nematic liquid crystalline polyester for use as a twisted nematic liquid crystalline composition.

In the present invention, to be more specific, the liquid crystalline material described above is:

① a nematic liquid crystalline polyester;

② a composition comprising a nematic liquid crystalline polyester and an optically active low-molecular compound;

③ a composition comprising a nematic liquid crystalline polyester and an optically active high-molecular compound; or ④ a twisted nematic liquid crystalline polyester having an optically active group in the main chain thereof.

The liquid crystalline material is subjected to a film forming process which will be described below. In the state of liquid crystal the liquid crystalline material forms a twisted nematic orientation. When the liquid crystalline material is cooled at an arbitrary cooling speed in the state of liquid crystal, a phase transfer to a crystal phase does not occur substantially. In the state of liquid crystal the liquid crystalline material used in the present invention exhibits a nematic or twisted nematic orientation of monodomain, which oriented state can be fixed easily by cooling. In fixing a (twisted) nematic phase stably, when viewed from the standpoint of crystal phase series, if a crystal phase is present in a lower temperature zone than the (twisted) nematic phase, there inevitably occurs a passage through the crystal phase at the time cooling for the fixing, with consequent destruction of the (twisted) nematic orientation once formed. The liquid crystalline polyesters employable in the present invention, more particularly, a nematic liquid crystalline polyester, a composition comprising a nematic liquid crystalline polyester and an optically active low- or high-molecular compound, and a twisted nematic liquid crsytalline polyester having an optically active group in the main chain thereof, basically exhibit a (twisted) nematic phase of monodomain in the state of liquid crystal and assume a glassy state at a temperature of not higher than the liquid crystal transfer temperature. Therefore, the molecular orientation in the state of liquid crystal, i.e., (twisted) nematic orientation, can be retained as it is by cooling to a temperature below the liquid crystal transfer temperature (glass transfer point).

By utilizing this feature it is possible to fabricate a novel optical film.

In the present invention it is desirable that the optical film be formed using an orienting substrate and various processes which will be described below.

It is preferable for the orienting substrate to have an intra-surface anisotropy. Examples are plastic film substrates formed of such plastics as polyimides, polyimide-amides, polyamides, polyether imides, polyether ketones, polyketone sulfides, polyether sulfones, polysulfones, polyphenylene sulfides, polyphenylene oxides, polyethylene terephthalate, polyethylene naphthalate, polycarbonates, polyarylates, acrylic resins, polyvinyl alcohol's, and phonemic resins, the said plastic film substrates having rubbed surfaces, glass or plastic substrates each having a rubbed polyimide film or polyvinyl alcohol film, and glass substrates such as alkali glass, borosilicate glass, and flint glass, having an etched surface in the form of slits.

The optical film of the present invention is obtained by applying the liquid crystalline polyester uniformly onto the orienting substrate exemplified above, followed by uniform orientation and subsequent fixing of the resulting orientation. The application of the liquid crystalline polyester onto the orienting substrate may be carried out in the state of a solution of the polyester in any of various solvents or in a melted state of the polyester. In view of the manufacturing process it is desirable to apply the liquid crystalline polyester in the state of a solution onto the orienting substrate.

The following description is now provided about this solution application.

The liquid crystalline polyester is dissolved in a solvent to prepare a solution having a predetermined concentration. Since the film thickness (thickness of a layer formed by the liquid crystalline polyester) is determined in the stage of application of the polyester to the substrate, it is necessary that the concentration of the solution and the thickness of the resulting film be controlled precisely.

The solvent employable in preparing the liquid crystalline polymer solution differs depending on, say, the composition ratio of the polyester, but usually it is selected from among halogenated hydrocarbons such as chloroform, dichloromethane, carbon tetrachloride, dichlorethane, tetrachloroethane, trichloroethylene, tetrachloroethylene, chlorobenzene, and o-dichlorobenzene, phenols such as phenol and parachlorophenol, aromatic hydrocarbons such as benzene, toluene, xylene, methoxybenzene, and 1,2-dimethoxybenzene, acetone, ethyl acetate, tert-butyl alcohol, glycerin, ethylene glycol, triethylene glycol, ethylene glycol monomethyl ether, diethylene glycol dimethyl ether, ethyl cellosolve, butyl cellosolve, 2-pyrrolidone, N-methyl-2-pyrrolidone, pyridine, triethylamine, tetrahydrofuran, dimethylformamide, diemthylacetamide, dimethyl sulfoxide, acetonitrile, butyronitrile, and carbon disulfide, as well as mixed solvents thereof, e.g., mixed solvents of halogenated hydrocarbons and phenols.

The concentration of the solution differs depending on the solubility of the liquid crystalline polyester used and the thickness of a desired optical film, but is usually in the range of 3 to 50 wt %, preferably 7 to 30 wt %.

The solution of the liquid crystalline polyester thus prepared to a desired concentration using any of the solvents referred to above is then applied onto the orienting substrate described above. As the coating method there may be adopted, for example, spin coating method, roll coating method, die coating method, printing method, dipping/pulling-up method, or curtain coating method.

After the application of the solution, the solvent is removed, allowing a layer of the liquid crystalline polyester having a uniform thickness to be formed on the orienting substrate. How to remove the solvent is not specially limited insofar as the method adopted permits substantial removal of the solvent used without flowing or dropping of the liquid crystalline polyester layer. Usually, the solvent is removed by drying at room temperature, drying in a drying oven, or spraying of warm or hot air.

After drying, there is performed a heat treatment at a temperature in the range of 50° to 300° C., preferably 100° to 260° C., allowing the liquid crystalline polyester to be oriented in the state of liquid crystal. The heat treatment time differs depending on, say, the composition ratio of the liquid crystalline polyester used, but is usually in the range of 10 seconds to 120 minutes, preferably 30 seconds to 60 minutes. If the heat treatment time is shorter than 10 seconds, it may be impossible to obtain a satisfactory uniform orientation in the state of liquid crystal. A longer heat treatment time than 120 minutes may result in deterioration of the productivity.

Thus, both such heat treatment times outside the above range are not so desirable.

In the above manner the liquid crystalline polyester can be oriented uniformly throughout the whole surface of the orienting substrate in the state of liquid crystal.

In the above heat treatment process there may be utilized a magnetic or electric field for attaining a uniform orientation of the liquid crystalline polyester.

By subsequent cooling to a temperature of not higher than the liquid crystal transition point of polyester, the uniform orientation thus formed by the heat treatment can be fixed without impairing at all the uniformity of the orientation.

The cooling temperature is not specially limited if only it is below the liquid crystal transition point of the polyester. For example, by cooling at a temperature 10° C. lower than the liquid crystal transition point it is possible to fix the uniform orientation. How to effect cooling is not specially limited, either. The orientation is fixed by a mere transfer from the heated atmosphere in the heat treatment process into an atmosphere of a temperature below the liquid crystal transition point, say, room temperature. For enhancing the production efficiency there may be performed a forced cooling such as air cooling or water cooling, or a slow cooling.

The optical film of the present invention can be formed through the following process.

The following are mentioned as the mode of use of the optical film.

①  The orienting substrate is peeled off from the optical film and the film alone is used.

②  The optical film on the orienting substrate is used as it is.

③  The optical film is separated from the orienting substrate, then is laminated to another substrate different from the orienting substrate, and is used as the laminate.

In case of using the optical film alone, the film alone can be obtained, for example, by a method wherein the orienting substrate is peeled off mechanically using a roll or the like at the interface between the substrate and the optical film, a method wherein the orienting substrate with the optical film thereon is dipped in a solvent which is a poor solvent for all of structural materials, followed by a mechanical separation, a method involving the application of ultrasonic wave in a poor solvent, a method wherein a temperature variation is created by utilizing the difference in thermal expansion coefficient between the orienting substrate and the film, or a method wherein the orienting substrate itself or an alignment film formed thereon is dissolved off. Since the releasability of the orienting substrate differs depending on the composition ratio of the liquid crystalline polyester used and the adherence of the polyester to the substrate, so there should be adopted a method best suited to the system concerned. In case of using the optical film alone as an optical element, a certain thickness thereof may be insufficient for the film to exhibit a self-supporting property. In such a case, for ensuring the strength and reliability of the optical film it is preferred to use the optical film in a fixed state, using an adhesive or a pressure-sensitive adhesive, onto a substrate having desirable optical properties, for example a plastic substrate such as a polymethacrylate, polycarbonate, polyvinyl alcohol, polyether sulfone, polysulfone, polyarylate, polyimide, amorphous polyolefin, or triacetyl cellulose substrate.

A description will now be given of the case where there is used the optical film as formed on the orienting substrate. If the orienting substrate is transparent and optically isotropic or if it is a necessary member for an optical element when it is to be used as the optical element, the film can be used as it is as the optical element.

Further, the optical film formed by fixing the orientation of the liquid crystalline polyester on the orienting substrate may be released from the orienting substrate, then laminated onto another substrate more suitable for a desired optical application, and the resulting laminate may be used. For example, such a laminate composed of the optical film and another substrate different from the orienting substrate may be incorporated as an optical element into TN-LCD. In this connection there may be adopted the following method.

A substrate (hereinafter referred to as the "second substrate") suitable for a desired optical element and the optical film on the orienting substrate are laminated together using, say, an adhesive or a pressure-sensitive adhesive. Then, the orienting substrate is peeled off at the interface between it and the optical film, which film is then transferred onto the second substrate to afford the desired optical element.

The second substrate used in the said transfer is not specially limited insofar as it has a moderate planeness.

But a glass substrate or a transparent plastic film having an optical isotropy is preferred. As examples of such a plastic film are mentioned polymethyl methacrylate, polystyrene, polycarbonate, polyether sulfone, polyphenylene sulfide, polyarylate, amorphous polyolefin, triacetyl cellulose, and epoxy resin films. Above all, polymethyl methacrylate, polycarbonate, polyarylate, polyether sulfone, and triacetyl cellulose films are preferred. Even an optically anisotropic film is employable as the second substrate if it is a necessary member for a desired optical element. As examples of optically anisotropic films are mentioned retardation films and polarizing films obtained by stretching plastic films such as polycarbonate and polystyrene films.

The adhesive or pressure-sensitive adhesive for use in laminating the optical film onto the second substrate is preferably of the optical grade. For example, acrylic-, epxoy-, ethylene/vinyl acetate copolymer-, rubber-, or urethane-based adhesives or pressure-sensitive adhesives, or those based on mixtures thereof, may be used. Any of thermosetting, photo-curable, and electron beam-curable type adhesives may be used if only the adhesives are optically isotropic.

The transfer of the optical film onto the second substrate suitable for a desired optical element can be done by peeling off the orienting substrate at the interface between it and the optical film after bonding the second substrate to the film. As noted previously, the substrate peeling operation may be effected by any of a mechanical method using a roll or the like, a method involving the application of ultrasonic wave in a poor solvent, a method wherein a temperature variation is created by utilizing the difference in thermal expansion coefficient between the orienting substrate and the optical film, and a method wherein the orienting substrate itself or an alignment film formed thereon is dissolved off.

The releasability of the orienting substrate differs depending on, say, the composition ratio of the liquid crystalline polyester used and the adherence of the polyester to the orienting'substrate, so there should be adopted a method best suited to the system concerned.

On the optical film may be provided a protective layer such as a transparent plastic film for the purpose of surface protection, enhancing the strength and improving the environmental reliability.

The optical film may be combined with another optical member such as a polarizing sheet or a retardation film.

As characteristic optical parameters of the optical film there are mentioned film thickness, intra-film surface retardation value, and twist angle. These optical parameters differ depending on for what purpose the film is to be used. But the film thickness is usually in the range of 1 to 20 μm, preferably 0.2 to 10 μm, particularly preferably 0.3 to 5 μm.

The intra-film surface retardation value is, for a monochromatic light of 550 nm, usually in the range of 10 to 4,000 nm, preferably 20 to 3,500 nm, particularly preferably 30 to 3,500 nm. The intra-film surface retardation value as referred to herein means the product of intra-film surface birefringence and film thickness.

Further, the twist angle is usually in the range of 0° to 7,200° (equivalent to 20 turns), preferably 0° to 5,400° (equivalent to 15 turns), particularly preferably 0° to 3,600° (equivalent to 10 turns). In the optical film, the direction of directors in the liquid crystal which forms the optical film changes successively in the film thickness direction. Therefore, the twist angle as referred to herein in connection with the optical film is defined to be a director turned angle between one side to the opposite side of the film.

The optical film of the invention is not only superior in orientability but also is easy to be fixed its liquid crystal orientation in glass phase and is superior in the liquid crystal orientation holding ability. Therefore, the optical film is applicable to various optical elements for which is required a high-temperature durability, such as retardation film, viewing angle improving film, color compensating film, optical rotator film, and cholesteric polarizing sheet. Thus, its industrial utility is very high.

EXAMPLES

The following examples are given to further illustrate the present invention, but it is to be understood that the invention is not limited thereto. Analyzing methods were used in the following examples, which are as follows:
(1) Determining the Composition of a Liquid Crystalline Polyester A liquid crystalline polyester is dissolved in deuterated chloroform or deuterated trifluoroacetic acid and its composition is determined using 1H-NMR of 400 MHz (JNM-GX400, a product of Japan Electron Optics Laboratory Co., Ltd.).
(2) Determining an Inherent Viscosity Determined in a mixed phenol/tetrachloroethane (60/40 weight ratio) solvent at 30° C. using a Ubbelohde viscometer.
(3) Determining a Liquid Crystal Phase Series Determined by measurement using a DSC (Perkin Elmer DSC-7) and observation using an optical microscope (a polarizing microscope BH2, a product of Olympus Optical Co., Ltd.).
(4) Measuring a Refractive Index Measured using an Abbe's refractometer (Type-4, a product of Atago Co., Ltd.).
(5) Polarization Analysis An ellipsometer DVA-36VWLD (a product of Misoshiri Optical Industry Co., Ltd.).
(6) Determining the Film Thickness Determined using a surface texture analysis system Dektak 3030ST (a product of SLOAN) and also using a method wherein the film thickness is determined from interference wave measurement (an ultraviolet, visible and near-infrared spectrophotometer V-570, a product of Nippon Bunko Co., Ltd.) and refractive index data.

Example 1

100 mmol of p-acetoxybenzoic acid, 85 mmol of terephthalic acid, 10 mmol of trimesic acid, 50 mmol of methylhydroquinone diacetate, and 50 mmol of catechol diacetate were stirred under heating at 280° C. for 8 hours in a current of nitrogen to prepare a polyester. Inherent viscosity, $\eta_{inh}$ of the polyester was 0.200 (dl/g). As a result of DSC measurement and observation using the polarizing microscope it turned out that Tg was 98° C., with glass phase formed, and that a nematic phase was exhibited at a temperature higher than Tg. There was prepared a 15 wt % solution of the polyester in a mixed phenol/tetrachloroethane solvent (60/40 weight ratio), which solution was then applied onto a glass sheet having a rubbed polyimide film by a spin coating method. The thus-coated glass sheet was then dried on a hot plate at 70° C. for 1 hour, then heat-treated in a clean oven at 200° C. for 30 minutes, then taken out from the oven and allowed to cool naturally. The resulting polyester film was found to have a thickness of 4.2 μm, a birefringence Δn of 0.19 by refractive index measurement and a retardation of 800 nm. The liquid crystalline polyester film formed on the glass substrate was transparent, and by observation using the polarizing microscope it turned out that a nematic phase was fixed.

Next, the following test was conducted to check the orientation holding performance. A polyvinylbutyral sheet was put on the polyester film formed on the glass substrate, then a glass sheet was put thereon. This sample was held at 80° C. under a reduced pressure for 30 minutes. Thereafter, the pressure and temperature were brought back to atmospheric pressure and room temperature.

Subsequently, the sample was held at 118° C., which temperature is 20° C. higher than Tg, and under a pressure of 8 kgf/cm$^2$ for 30 minutes. Thereafter, the pressure and temperature were brought back to atmospheric pressure and room temperature. As a result of visual observation and polarizing microscope observation, with the sample held between polarizing sheets, it turned out that the state of orientation before the test was retained without any disorder of the orientation.

Comparative Example 1

Using 100 mmol of p-acetoxybenzoic acid, 100 mmol of terephthalic acid, 50 mmol of methylhydroquinone diacetate, and 50 mmol of catechol diacetate, a polyester was prepared in the same way as in Example 1. Inherent viscosity, $\eta_{inh}$, of the polyester thus prepared was 0.202 (dl/g). As a result of DSC measurement and observation using the polarizing microscope it turned out that Tg was 95° C., with glass phase formed, and that a nematic phase was exhibited at a temperature higher than Tg. Using this polyester, a film was formed on a glass substrate in the same manner as in Example 1. The liquid crystalline polyester film thus formed hand a thickness of 4.1 μm, a birefringence Δn of 0.20, and a retardation value of 820 nm. The liquid crystalline polyester film formed on the glass substrate was transparent, and by observation using the polarizing microscope it turned out that a nematic phase was fixed. The film was then checked for its orientation holding performance. An orientation holding test was conducted under the same conditions as in Example 1. Thereafter, the sample thus formed was held between polarizing sheets and subjected to a visual observation to find that the orientation was disordered, indicating a poor orientation holding performance.

Examples 2–5

In the same way as in Example 1 liquid crystalline polyesters of Examples 2 to 5 were prepared and films were formed therefrom, which were then subjected to an orientation holding performance test. Properties of the polyesters thus prepared, conditions for the orientation holding performance test, and the results of the test are shown in Table 2, from which it is seen that all of the polyesters permit fixing of a nematic phase and possess an orientation holding ability as in Example 1.

Comparative Examples 2~5

In the same way as in Example 1 liquid crystalline polyesters of Comparative Examples 2 to 5 were prepared and films were formed therefrom, which were then subjected to an orientation holding performance test. Properties of the polyesters, conditions for the orientation holding performance test, and the results of the test are shown in Table 2, from which it is seen that all of the polyesters permit fixing of a nematic phase, but are poor in their orientation holding performance.

Example 6

100 mmol of p-acetoxybenzoic acid, 88 mmol of terephthalic acid, 8 mmol of trimesic acid, 50 mmol of methylhydroquinone diacetate, and 50 mmol of catechol diacetate were stirred under heating at 275° C. for 10 hours in a current of nitrogen to prepare a polyester. Inherent viscosity $\eta_{inh}$ of the polyester was 0.181 dl/g. As a result of DSC measurement and observation using the polarizing microscope it turned out that, as shown in Table 8, Tg was 110° C., with glass phase formed, and that a nematic phase was exhibited at a temperature higher than Tg.

The polyester was melt-mixed with an optically active polyester shown in Table 9 at a weight ratio of 95:5 to afford a composition. Thereafter, a solution containing 15 wt % of the composition in a mixed phenol/tetrachloroethane (60/40 weight ratio) solvent was prepared. The solution thus prepared was then applied onto a glass sheet having a rubbed polyimide film by means of a spin coating method.

After subsequent drying on a hot plate of 70° C. for 1 hour, the thus-coated glass sheet was heat-treated in a clean oven at 210° C. for 30 minutes, then was taken out from the oven and allowed to cool naturally to give a polyester film 1, which was found to have a thickness of 3.8 μm. Further, as a result of having measured a refractive index and a twist angle it turned out that the film 1 hand a birefringence Δn of 0.20, a retardation value of 760 nm, and a twist angle of 240°. The film 1 formed on the glass substrate was transparent, and by observation using the polarizing microscope it turned out that a twisted nematic phase was fixed.
(Orientation Holding Performance Test)

First, a polyvinyl butyral sheet was put on the film 1 which was formed on the glass substrate through a rubbed polyimide film, and a glass sheet was put thereon to afford a sample. The sample was held at 80° C. under a reduced pressure for 30 minutes. Thereafter, the pressure and temperature were brought back to atmospheric pressure and room temperature. Subsequently, the sample was held under a pressure of 8 kgf/cm$^2$ and at a temperature of 130° C., which is 20° C. higher than Tg, for 30 minutes, then the pressure and temperature were brought back to atmospheric pressure and room temperature. The sample was then held between polarizing sheets and subjected to visual observation and observation using the polarizing microscope to find that the state of orientation before the test was retained without any disorder of orientation.
(Optical Characteristics Evaluation of Film 1)

The film formed on the glass substrate through a rubbed polyimide film was checked in the following manner for its color compensating effect for a super twisted nematic ("STN" hereinafter) liquid crystal display.

In accordance with the arrangement shown in FIG. 1, the glass sheet having the film 1 on its upper surface was laminated to an upper surface of an STN liquid crystal cell of 1/100 duty drive with use of a pressure-sensitive adhesive, and a polarizing sheet was laminated thereon to afford a laminated cell.

Directions of upper and lower polarizing sheets, rubbing directions of upper and lower electrode substrates, and a molecular orientation direction of the film 1 are as shown in FIG. 2. A twist angle of the liquid crystal molecules in the liquid crystal cell is 90°, the angle between the rubbing direction of the upper electrode substrate and the molecular orientation direction at the bottom side of the film 1 (the side which is in contact with the rubbed polyimide film) is 90°, the angle between a polarization axis of the lower polarizing sheet and the rubbing direction of the lower electrode substrate is about 40°, and a molecular twist angle in the film 1 is 240° in the direction opposite to the liquid crystal molecules in the liquid crystal cell. This liquid crystal cell exhibits black when no voltage is applied thereto, while it exhibits white when voltage is applied thereto. A complete black-and-white display could be attained. From the above results the film 1 proved to exhibit a color compensating effect.

Example 7

Using 50 mmol of p-acetoxycinnamic acid, 85 mmol of 2,6-naphthalenedicarboxylic acid, 10 mmol of trimesic acid, 13 mmol of 3,5,3',5'-tetramethyl-4,4'-biphneol, 80 mmol of 3-chlorocatechol diacetate, and 7 mmol of (S)-3-methyladipic acid, a polyester was prepared in the same manner as in Example 6. Properties of the polyester thus prepared are as set out in Table 8. Inherent viscosity $\eta_{inh}$ of the polyester was 0.140 dl/g, Tg was 106° C., with glass phase formed, and a nematic phase was exhibited at a temperature higher than Tg.

There was prepared a 17 wt % solution of this polyester in a mixed phenol/tetrachloroethane (60/40 weight ratio) solvent. Using this solution and under the conditions shown in Table 9, there was formed a film 2 with a twisted nematic orientation fixed on a glass sheet through a rubbed polyimide film.

The film 2 was then subjected to an orientation holding performance test in the same way as in Example 6.

As a result, it turned out that the state of orientation before the test was retained without any disorder of the orientation.

Further, the film 2 was checked for a color compensating effect for an STN liquid crystal display in the same manner as in Example 6 to find that a complete black-and-white display was obtained. Thus, the film 2 proved to exhibit a color compensating effect.

Examples 8~12

Polyesters shown in Table 8 were prepared in the same way as in Example 6 or 7 and films were formed using them. Then, in the same manner as in Example 6 or 7 the films were subjected to an orientation holding performance test and checked for their color compensating effect for an STN liquid crystal display, the results of which are set out in Table 9.

Example 13

Using 100 mmol of 6-acetoxy-2-naphthoic acid, 40 mmol of isophthalic acid, 45 mmol of terephthalic acid, 10 mmol of trimesic acid, 50 mmol of resorcinol diacetate, and 50 mmol of 3-tert-butylcatechol diacetate, a polyester was prepared in the same way as in Example 6. Inherent viscosity $\eta_{inh}$ of the polyester was 0.140 dl/g, Tg was 121° C., with glass phase formed, and a nematic phase was exhibited at a higher temperature than Tg.

Then, the polyester thus prepared and a polyester shown in Table 10 were melt-mixed together at a weight ratio of 98:2 to afford a composition. Thereafter, a 20 wt % solution of the composition in dimethylacetamide was prepared. The solution was then applied onto a glass substrate having a rubbed polyimide film by a curtain coating method. After subsequent drying on a hot plate of 70° C. for 1 hour, the thus coated and dried glass plate was heat-treated in a clean oven of 220° C. for 30 minutes and was then taken out from the oven and allowed to cool naturally to give a film 8 on the glass substrate through the rubbed polyimide film. The thickness of the film was 4.9 μm. As a result of having measured a refractive index and a twist angle it turned out that the film hand a birefringence Δn of 0.22, a retardation value of 1,080 nm, and a twist angle of 90°. The film 8 was transparent, and as a result of observation using the polarizing microscope it turned out that a nematic orientation was fixed.

Further, as a result of a subsequent orientation holding performance test conducted in the same way as in Example 6 it turned out that the state of orientation before the test was retained without any disorder of the orientation.

Then, two polarizing sheets were put respectively above and below the film 8 in the form of parallel and crossed Nicols and respective transmission spectra were measured. As a result, in the parallel Nicols arrangement the transmittance was almost 0% over a wide range of the visible light region, while in the crossed Nicols arrangement the film proved to have a transmittance of about 80% (FIG. 3). From the above results the film 8 proved to be effective as an optical film having characteristics as a 90° optical rotator.

Example 14

Using 100 mmol of p-acetoxy cinnamic acid, 87 mmol of terephthalic acid, 10 mmol of 1,4-cyclohexanedicarboxylic acid, 2 mmol of trimesic acid, 95 mmol of 3-tert-butylcatechol diacetate, and 5 mmol of (S)-2-methyl-1,4-butanediol, a polyester was prepared in the same manner as in Example 6. The polyester thus prepared hand an inherent viscosity $\eta_{inh}$ of 0.124, a Tg of 95° C., with glass phase formed, and exhibited a twisted nematic phase at a higher temperature than Tg.

A 17 wt % solution of the polyester in dimethylformamide was prepared and then applied onto a glass substrate having a rubbed polyimide film under the conditions shown in Table 10 to form a film 9 with a twisted nematic orientation fixed.

The film 9 was then subjected to an orientation holding performance test in the same way as in Example 6 to find that the state of orientation before the test was retained without any disorder of the orientation.

Further, the film 9 was measured for transmission spectra in the parallel and crossed Nicols arrangements as in Example 13. As a result, the film 9 proved to be effective as an optical film having characteristics as a 90° optical rotator.

Example 15

In accordance with Examples 6 and 7 a polyester shown in Table 8 was prepared and formed into a film. Then, in accordance with Examples 13 and 14 the film was subjected to an orientation holding performance test and a check was made as to whether the film hand characteristics as a 900 optical rotator. The results obtained are as set out in Table 9.

Comparative Example 6

Using 100 mmol of p-acetoxybenzoic acid, 100 mmol of terephthalic acid, 50 mmol of methylhydroquinone diacetate, and 50 mmol of catechol diacetate, a polyester was prepared in the same way as in Example 6. The polyester thus prepared hand an inherent viscosity $\eta_{inh}$ of 0.178 dl/g, a Tg of 107° C., with glass phase formed, and exhibited a nematic phase at a higher temperature than Tg.

The polyester was melt-mixed with an optically active polyester shown in Table 9 at a weight ratio of 96:4 to afford a composition. Then, a 15 wt % solution of the composition in a mixed phenol/tetrachloroethane (weight ratio: 60/40) solvent was prepared and applied onto a glass substrate having a rubbed polyimide film by a spin coating method. After subsequent drying on a hot plate of 70° C. for 1 hour, the thus coated and dried glass substrate was heat-treated in a clean oven of 210° C. for 30 minutes and was then taken out from the oven and allowed to cool naturally to give a comparative film 1. The thickness of the film was 3.7 μm. As a result of having measured a refractive index and a twist angle it turned out that the film hand a birefringence Δn of 0.21, a retardation value of 770 nm, and a twist angle of 241°. The comparative film 1 formed on the glass substrate was transparent, and as a result of observation using the polarizing microscope it turned out that a nematic phase was fixed.

The comparative film 1 was subjected to an orientation holding performance test in the same manner as in Example 6 to find that orientation was disordered and that the film did not have an orientation holding ability.

Comparative Example 7

A polyester shown in Table 8 was prepared in the same way as in Example 7 and was then formed into a comparative film 2 with a twisted nematic phase fixed in the same manner as in Example 7. The comparative film 2 was subjected to an orientation holding performance test in the same way as in Example 6 to find that orientation was disordered and that the film did not have an orientation holding ability.

Comparative Example 8

A polyester shown in Table 8 was prepared in the same way as in Example 6 and was then melt-mixed with an optically active polyester shown in Table 10 at a weight ratio of 98:2 to afford a composition. Then, a 20 wt % solution of the composition in dimethylacetamide was prepared. Using this solution and in the same manner as in Example 13 there was formed a comparative film 3 with a twisted nematic phase fixed. The comparative film 3 was then subjected to an orientation holding performance test in the same way as in Example 6 to find that orientation was disordered and that the film did not have an orientation holding ability.

Comparative Example 9

A polyester shown in Table 8 was prepared in the same way as in Example 7. Then, a 17 wt % solution of the polyester in dimethylformamide was prepared and formed into a comparative film 4 in the same manner as in Example 14. The comparative film 4 was subjected to an orientation holding performance test in the same way as in Example 6 to find that orientation was disordered and that the film did not have an orientation holding ability.

The results of the Examples and Comparative Examples are as tabulated below.

In the following tables 1–7, the numeral appearing beside each structural unit represents a molar composition ratio.

Fixing: The mark ⊚ indicates that orientation could be fixed.

Orientation holding performance test: Each film was held at a temperature 20° C. higher than Tg and under a pressure of 8 kgg/cm² for 30 minutes and was then checked visually for any disorder in its orientation.

Orientation Holding Performance:
 ⊚ . . . Orientation was held.
 X . . . Orientation was disordered.

In the following tables 8–17, the numeral appearing beside each structural unit represents a molar composition ratio.

In the phase series, I: isotropic phase, N: nematic phase, N*: twisted nematic phase, g: glass phase.

In the color compensating effect, the mark ⊚ indicates that the same effect was obtained.

In the optical rotatory power, the mark ⊚ indicates that the film tested was effective.

The orientation holding performance test was conducted at a temperature 20° C. higher than Tg and under a pressure of 8 kgf/cm² for 30 minutes. Thereafter, the film tested was checked visually for any disorder in its orientation.
 ⊚: Orientation was held.
 X: Orientation was disordered.

TABLE 1

| Ex. | structure and composition | $\eta$inh (dl/g) | Tg (° C.) | LC phase | fixing | orientation holding performance test |||
|---|---|---|---|---|---|---|---|---|
| | | | | | | | temp (° C.) | result |
| 1 | 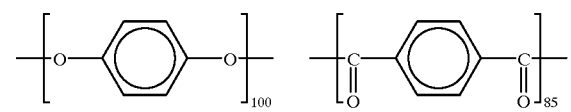 | 0.200 | 98 | nematic | ⊚ | | 118 | ⊚ |

TABLE 1-continued

| Ex. | structure and composition | ηinh (dl/g) | Tg (° C.) | LC phase | fixing | orientation holding performance test temp (° C.) | result |
|---|---|---|---|---|---|---|---|
| | [structures shown] | | | | | | |
| 2 | [structures shown] | 0.145 | 113 | nematic | ◉ | 133 | ◉ |

TABLE 2

| Ex. | structure and composition | ηinh (dl/g) | Tg (° C.) | LC phase | fixing | orientation holding performance test temp (° C.) | result |
|---|---|---|---|---|---|---|---|
| 3 | [structures shown] | 0.190 | 118 | nematic | ◉ | 138 | ◉ |

TABLE 2-continued
| Ex. structure and composition | ηinh (dl/g) | Tg (° C.) | LC phase | fixing | temp (° C.) | result |
|---|---|---|---|---|---|---|
| 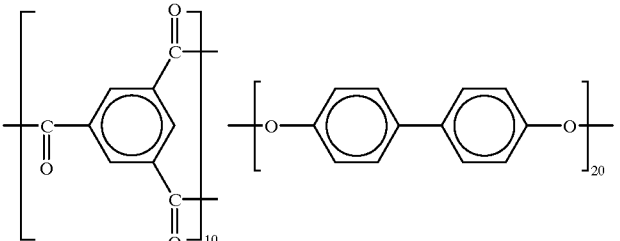 | | | | | | |
TABLE 3
| Ex. structure and composition | ηinh (dl/g) | Tg (° C.) | LC phase | fixing | temp (° C.) | result |
|---|---|---|---|---|---|---|
| 4 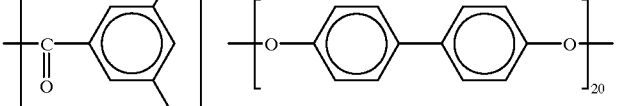 | 0.250 | 93 | nematic | ◎ | 113 | ◎ |

TABLE 4

| Ex. | structure and composition | ηinh (dl/g) | Tg (° C.) | LC phase | fixing | orientation holding performance test temp (° C.) | result |
|---|---|---|---|---|---|---|---|
| 5 | [structures: naphthalene-O/C(=O) ₅₀; phenyl-O-C(=O) ₅₀; terephthaloyl ₅₀; naphthalene-2,6-dicarbonyl ₄₇; isophthaloyl ₂; catechol-O,O ₁₀₀] | 0.120 | 120 | nematic | ⊙ | 140 | ⊙ |

TABLE 5

| Com. Ex. | structure and composition | ηinh (dl/g) | Tg (° C.) | LC phase | fixing | orientation holding performance test temp (° C.) | result |
|---|---|---|---|---|---|---|---|
| 1 | [structures: phenyl-O-C(=O) ₁₀₀; terephthaloyl ₁₀₀; methyl-phenyl-O,O ₅₀; catechol-O,O ₅₀] | 0.202 | 95 | nematic | ⊙ | 115 | x |

TABLE 5-continued
| Com. Ex. | structure and composition | ηinh (dl/g) | Tg (°C.) | LC phase | fixing | orientation holding performance test temp (°C.) | result |
|---|---|---|---|---|---|---|---|
| 2 | 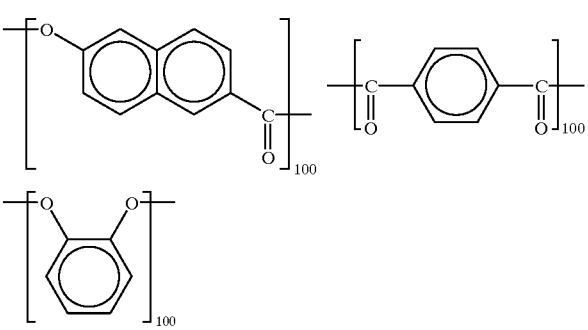 | 0.148 | 111 | nematic | ◉ | 131 | x |
TABLE 6
| Com. Ex. | structure and composition | ηinh (dl/g) | Tg (°C.) | LC phase | fixing | orientation holding performance test temp (°C.) | result |
|---|---|---|---|---|---|---|---|
| 3 | 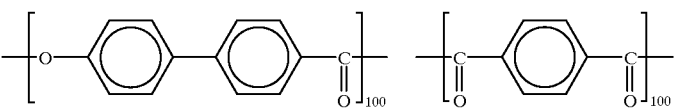 | 0.190 | 114 | nematic | ◉ | 134 | x |

TABLE 7
| Com. Ex. | structure and composition | ηinh (dl/g) | Tg (° C.) | LC phase | fixing | temp (° C.) | result |
|---|---|---|---|---|---|---|---|
| 4 | 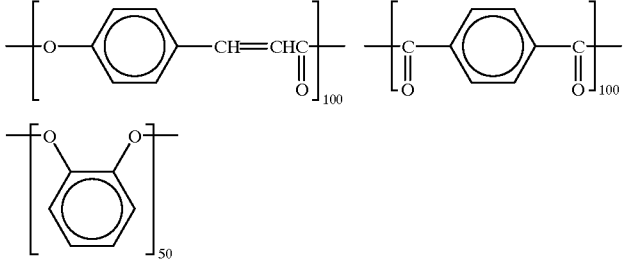 | | | | | | |
| 5 | 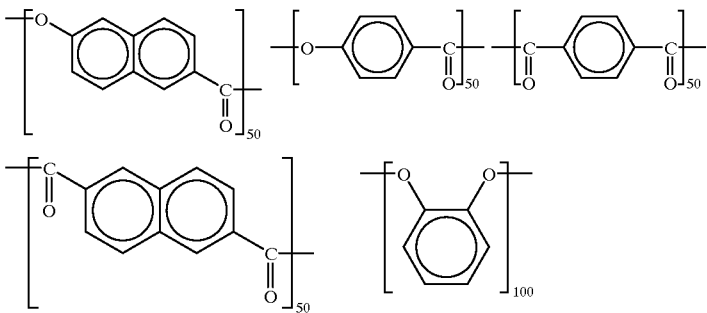 | 0.121 | 120 | nematic | ◉ | 140 | x |

TABLE 8

| Ex. | structure and composition | ηinh (dl/g) | Tg (°C.) | phase series | ratio (A:B) | sub-strate | heat treat-ment (°C. × min) | thick-ness (μm) | twist | color com-pen-sating effect | orientation holding per-formance temp (°C.) | results |
|---|---|---|---|---|---|---|---|---|---|---|---|---|
| 6 | (structures shown) | 0.181 | 110 | I → N → g | 95:5 | glass | 210 × 30 | 3.8 | 240 | ◎ | 130 | ◎ |

TABLE 8-continued

| Ex. | structure and composition | ηinh (dl/g) | Tg (°C.) | phase series | ratio (A:B) | sub-strate | heat treatment (°C. × min) | thickness (μm) | twist | color compensating effect | orientation holding performance temp (°C.) | results |
|---|---|---|---|---|---|---|---|---|---|---|---|---|
| 7 | (structures shown) | 0.140 | 106 | I → N*→ g | 100:0 | glass | 210 × 30 | 4.0 | 242 | ◎ | 126 | ◎ |

TABLE 9

| Ex. | structure and composition | ηinh (dl/g) | Tg (°C) | phase series | ratio (A:B) | substrate | heat treatment (°C. × min) | thickness (μm) | twist | color compensating effect | orientation holding performance temp (°C.) | results |
|---|---|---|---|---|---|---|---|---|---|---|---|---|
| 8 | (structures A and B shown) | 0.250 | 107 | I → N → g | 91:9 | poly ethyl sulphone film | 200 × 25 | 3.5 | 239 | ◎ | 127 | ◎ |
| 9 | (structure shown) | 0.207 | 123 | I → N → g | 88:12 | glass | 220 × 15 | 3.7 | 245 | ◎ | 143 | ◎ |

TABLE 9-continued

| Ex. | structure and composition | ηinh (dl/g) | Tg (°C.) | phase series | ratio (A:B) | sub-strate | heat treat-ment (°C. × min) | thick-ness (um) | twist | color com-pen-sating effect | orientation holding per-formance temp (°C.) | results |
|---|---|---|---|---|---|---|---|---|---|---|---|---|

TABLE 10

| Ex. | structure and composition | ηinh (dl/g) | Tg (°C) | phase series | ratio (A:B) | sub-strate | heat treatment (°C. × min) | thickness (um) | twist | color compensating effect | orientation holding performance temp (°C.) | results |
|---|---|---|---|---|---|---|---|---|---|---|---|---|
| 10 | (A) / (B) | 0.150 | 144 | I → N → g | 94:6 | polyimide film | 220 × 10 | 4.2 | 240 | ◎ | 134 | ◉ |
| 11 | | 0.185 | 95 | I → N‡ → g | 100:0 | glass | 190 × 30 | 3.4 | 243 | ◎ | 115 | ◉ |

TABLE 10-continued

| Ex. | structure and composition | ηinh (dl/g) | Tg (°C.) | phase series | ratio (A:B) | sub- strate | heat treat- ment (°C. × min) | thick- ness (um) | twist | color com- pen- sating effect | orientation holding per- formance temp (°C.) | results |
|---|---|---|---|---|---|---|---|---|---|---|---|---|

TABLE 11

| Ex. | structure and composition | ηinh (dl/g) | Tg (° C.) | phase series | ratio (A:B) | substrate | heat treatment (° C. × min) | thickness (um) | twist | color compensating effect | orientation holding performance temp (° C.) | results |
|---|---|---|---|---|---|---|---|---|---|---|---|---|
| 12 | (structure) | 0.132 | 104 | I → N‡ → g | 100:0 | poly ethyl sulphone film | 205 × 15 | 3.8 | 241 | ◎ | 124 | ◎ |

TABLE 12

| Ex. | structure and composition | | | ηinh (dl/g) | Tg (°C.) | phase series | ratio (A:B) | sub-strate | heat treatment (°C. × min) | thick-ness (um) | twist | color com-pen-sating effect | orientation holding per-formance temp (°C.) | results |
|---|---|---|---|---|---|---|---|---|---|---|---|---|---|---|
| 6 | (A) [structures] | | | 0.178 | 107 | I → N → g | 96:4 | glass | 210 × 30 | 3.7 | 241 | ⊚ | 127 | x |
| | (B) [structures] | | | | | | | | | | | | | |

TABLE 12-continued

| Ex. | structure and composition | ηinh (dl/g) | Tg (°C.) | phase series | ratio (A:B) | sub- strate | heat treat- ment (°C. × min) | thick- ness (um) | twist | color com- pen- sating effect | orientation holding per- formance temp (°C.) | results |
|---|---|---|---|---|---|---|---|---|---|---|---|---|
| 7 | [structures shown] | 0.142 | 104 | I → N‡ → g | 100:0 | glass | 210 × 30 | 3.9 | 240 | ◉ | 124 | x |

TABLE 13

| Ex. | structure and composition | η inh (dl/g) | Tg (°C) | phase series | I → N | ratio (A:B) | sub-strate | heat treatment (°C × min) |
|---|---|---|---|---|---|---|---|---|
| 13 | (structures shown) | 0.140 | 121 | g | I → N | 98:2 | glass | 200 × 30 |
| 14 | (structures shown) | 0.124 | 95 | g | I → N‡ | 100:0 | glass | 200 × 20 |

TABLE 13-continued

| Ex. structure and composition | thickness (μm) | twist | color compensating effect | orientation holding performance temp (° C.) | results |
|---|---|---|---|---|---|
| 13 (A) | 4.9 | 90 | ◉ | 141 | ◉ |

TABLE 13-continued
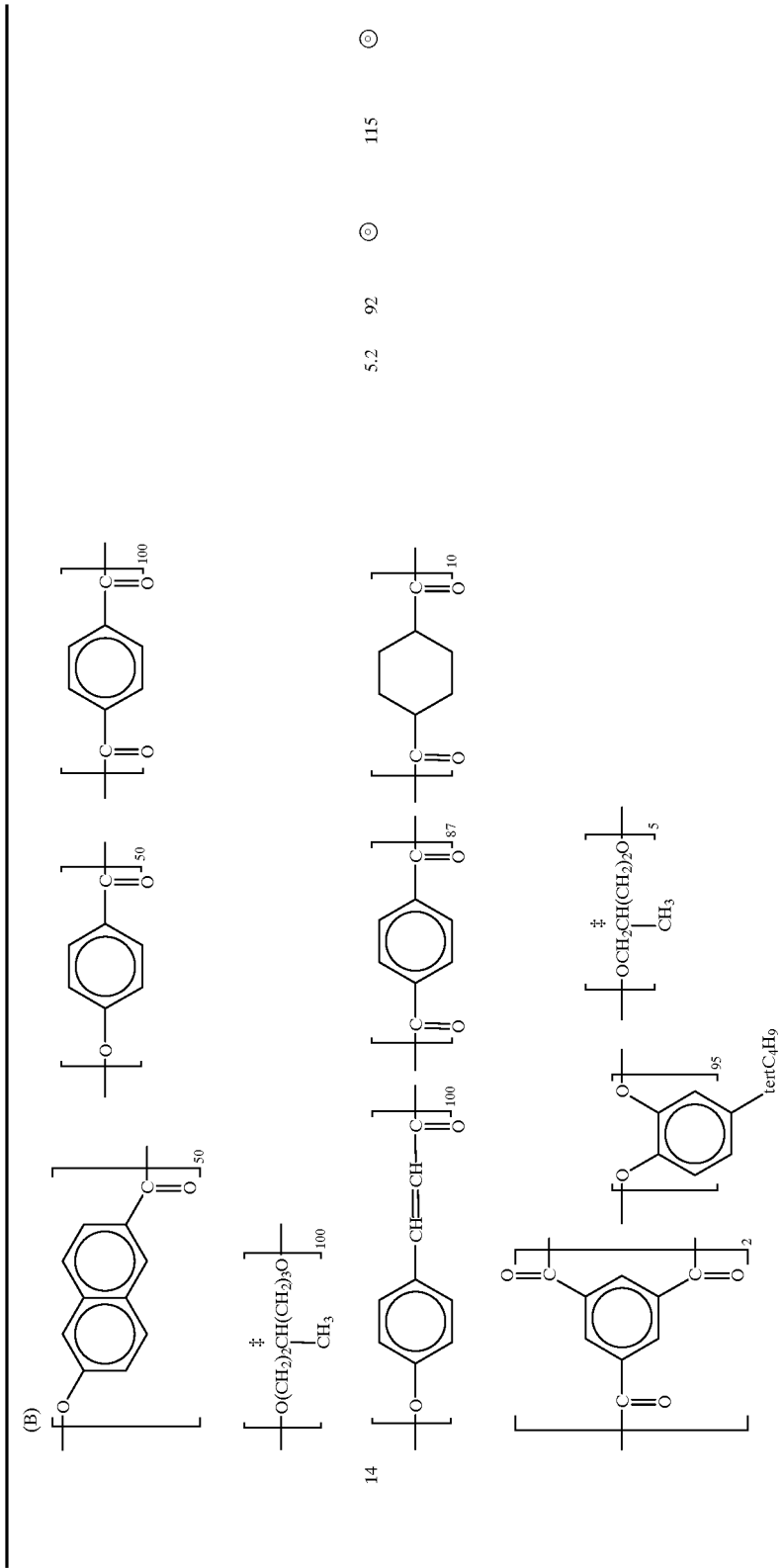

TABLE 14

| Ex. | structure and composition | η inh (dl/g) | Tg (°C) | phase series | ratio (A:B) | substrate | heat treatment (°C × min) | thickness (μm) | twist |
|---|---|---|---|---|---|---|---|---|---|
| 15 | (structures shown below) | 0.162 | 116 | I → N → g | 99:1 | glass | 220 × 10 | 4.2 | 88 |

(A): naphthalene-O-[C(=O)-C₆H₄-C(=O)-O]₉₂.₅-[C(=O)-C₆H₃(1,3,5)-C(=O)-O]₅ / catechol-O₁₀₀

(B): [OCH₂CH(CH₃)(CH₂)₂O]₁₀₀ / [C(=O)-naphthalene-C(=O)]₄₀ / [C(=O)-C₆H₄-C₆H₄-C(=O)]₆₀

| | color compensating effect | orientation holding performance | temp (°C) | result |
|---|---|---|---|---|
| Ex. structure and composition | — | — | — | — |

TABLE 14-continued
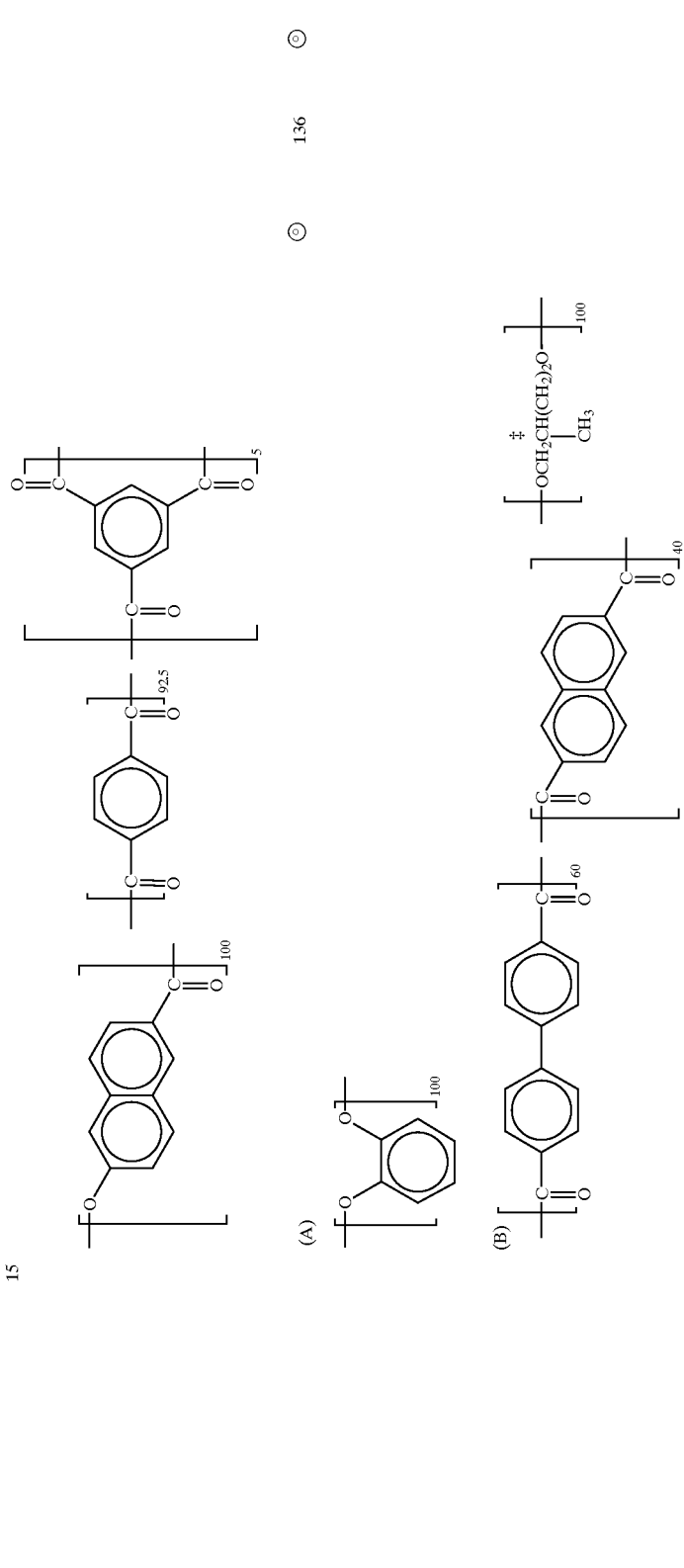

TABLE 15

| Ex. | structure and composition | η inh (dl/g) | Tg (°C) | phase series | ratio (A:B) | substrate | heat treatment (°C × min) | thickness (μm) |
|---|---|---|---|---|---|---|---|---|
| 16 | (structure) | 0.200 | 118 | I → N → g | — | — | — | — |
| 17 | (A)/(B) structures; (structure) | 0.251 | 107 | I → N → g | 96:4 | polycarbonate film | 205 × 15 | 4.6 |

TABLE 15-continued

| Ex. | structure and composition | twist | color compensating effect | orientation holding performance temp (° C.) | result |
|---|---|---|---|---|---|
| | (A) [structure with methyl-substituted dioxyphenylene]₁₀₀ (B) [—C(=O)—C₆H₄—C(=O)—]₅₀[—O—C₆H₄—C(=O)—]₁₀₀[—OCH₂CH₂O—]₅₀[—OCHCH₂O(CH₃)—]₅₀ | 98:2 glass | — | 220 × 10 | 4.0 |
| 16 | [—C(=O)—C₆H₄—C(=O)—O—]₅₀[—C(=O)—C₆H₄—C(=O)—]₄₅[—C(CH₂)₄C(=O)—]₄₀[—C(=O)—C₆H₃—C(=O)—]₁₀ (A) [dioxyphenylene]₁₀₀ | 89 | ⊙ | 138 | ⊙ |

TABLE 15-continued
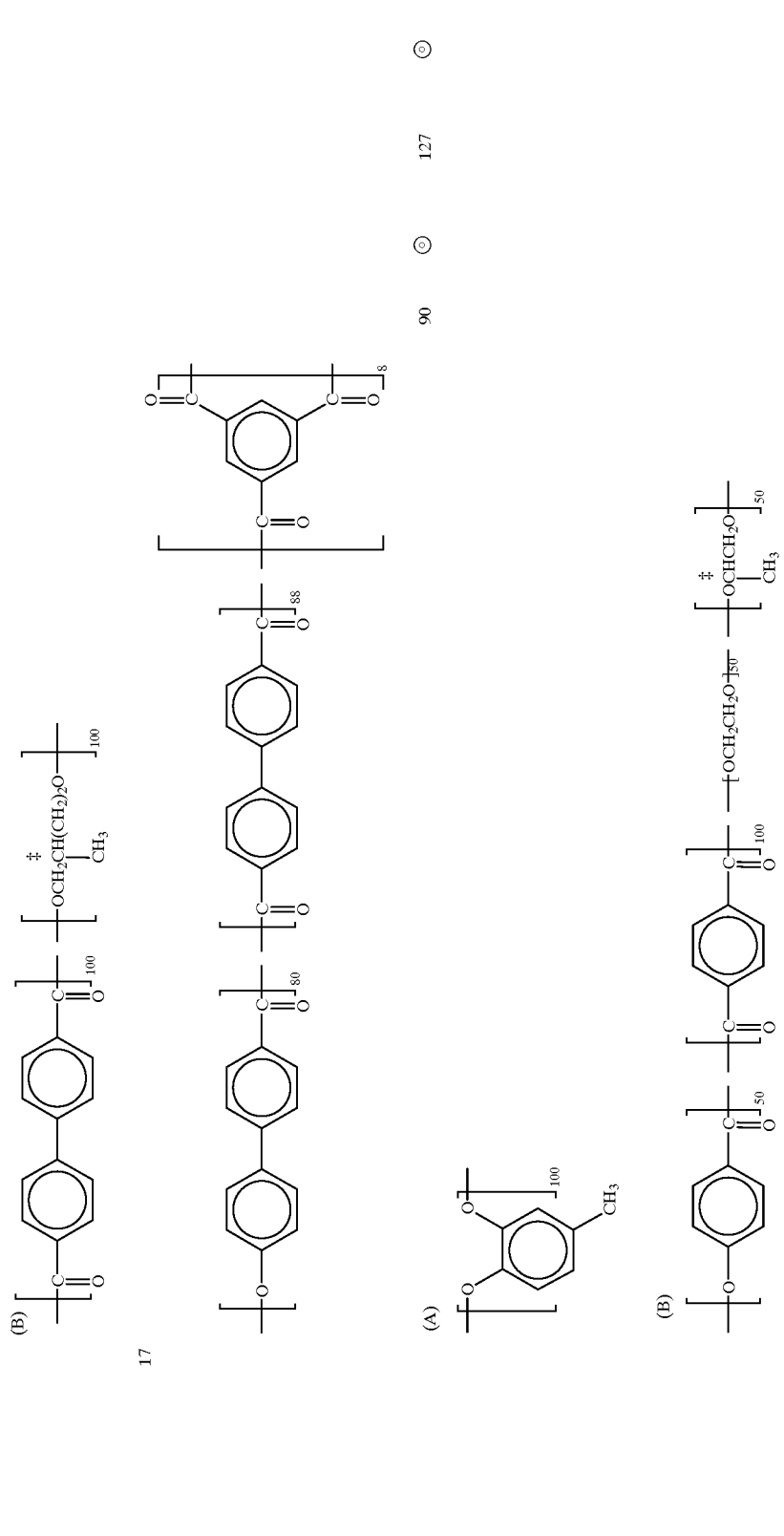

TABLE 16

| Ex. | structure and composition | η inh (dl/g) | Tg (°C) | phase series | ratio (A:B) | substrate | heat-treatment (°C × min) | thickness (μm) |
|---|---|---|---|---|---|---|---|---|
| 18 | (structure) | 0.155 | 94 | I → N‡ → g | 100:0 | polyamide film | 200 × 30 | |
| 19 | (structure) | 0.170 | 102 | I → N‡ → g | 100:0 | glass | 220 × 15 | 4.8 |

TABLE 16-continued

| Ex. | structure and composition | twist | color compensating effect | orientation holding performance temp (°C.) | results |
|---|---|---|---|---|---|
| 18 | [−OCH₂CH(CH₂)₂O−]₁₂ Cl / [−O−(biphenyl)−O−]₂₀ / [−O−(phenyl-tertC₄H₉)−]₆₈ / [−OC−(phenyl)−CO−]₁₀₀ / [−OC−(m-phenyl)−CO−]₁₂.₅ / [−OC−(phenyl)−CO−]₈₀ / [−OC−(1,3,5-phenyl)(CO−)−]₅ | 91 | ◉ | 114 | ◉ |
| 19 | [−OCH₂CHC₂H₅−]₂₀ CH₃ / [−O−(phenyl)−O−(biphenyl)−]₁₀ / [−OC−(phenyl)−CH=CH−(phenyl)−CO−]₅₀ / [−OC−(phenyl)−CO−]₈₈ / [−OC−(1,3,5-phenyl)(CO−)−]₈ | 92 | ◉ | 122 | ◉ |

TABLE 16-continued
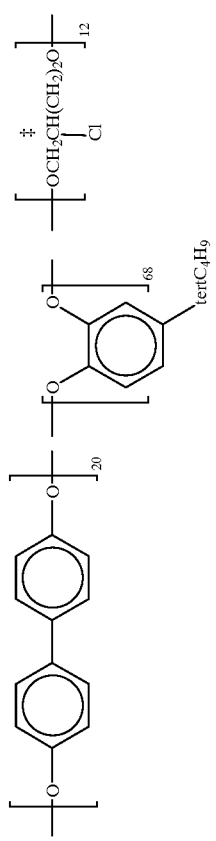

TABLE 17

| Ex. structure and composition | η inh (dl/g) | Tg (°C.) | phase series | ratio (A:B) | substrate | heat treatment (°C. × min) | thickness (μm) | twist | color | orientation |
|---|---|---|---|---|---|---|---|---|---|---|
| 8 (A)/(B) | 0.139 | 118 | I → N → g | 98:2 | glass | 220 × 25 | 4.8 | 90 | | |
| 9 (A)/(B) | 0.125 | 93 | I → N → g | 100:0 | glass | 200 × 15 | 5.1 | 89 | | |

TABLE 17-continued

| Ex. | structure and composition | compensating effect | holding performance temp (° C.) | results |
|---|---|---|---|---|
| 8 | (A) [structures] / (B) [structures] | ☉ | 138 | X |
| 9 | [structures] | ☉ | 113 | X |

TABLE 17-continued
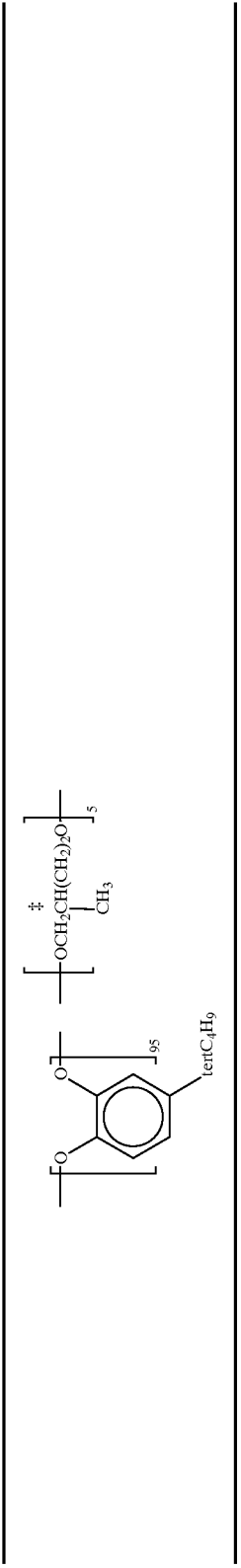

BRIEF DESCRIPTION OF DRAWING

In FIG. 1, the numeral 1 denotes an upper polarizing sheet, numeral 2 denotes a color compensator (optical film and substrate), numeral 3 denotes a liquid crystal cell, and numeral 4 denotes a lower polarizing sheet. In FIG. 2, the numeral 5 denotes a polarization axis direction of the lower polarizing sheet, numeral 6 denotes a rubbing direction of a lower electrode substrate in the liquid crystal cell, numeral 7 denotes a rubbing direction of an upper electrode substrate in the liquid crystal cell, numeral 8 denotes a molecular orientation direction at the bottom of the optical film, numeral 9 denotes a molecular orientation direction at the top of the optical film, numeral 10 denotes a polarization axis direction of the upper polarizing sheet, numeral 11 denotes a twist angle of the liquid crystal molecule in the liquid crystal cell, numeral 12 denotes a molecular twist in the optical film, numeral 13 denotes an angle between 7 and 8, and numeral 14 denotes an angle between 5 and 6.

Figure 1:
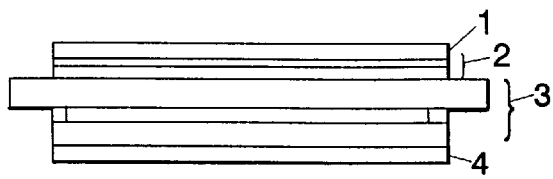
FIG. 1 is a sectional view of a liquid crystal cell used in a working example of the present invention, with layers of a pressure-sensitive adhesive omitted which layers have been used for laminating constituent layers.
Figure 2:
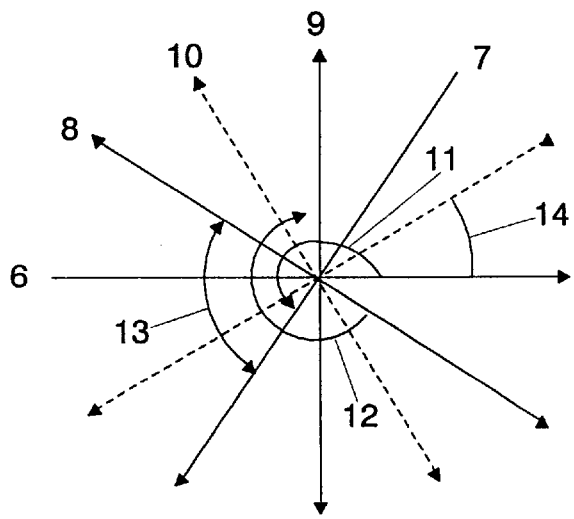
FIG. 2 shows a correlation of axes of materials which constitute the liquid crystal cell.
Figure 3:
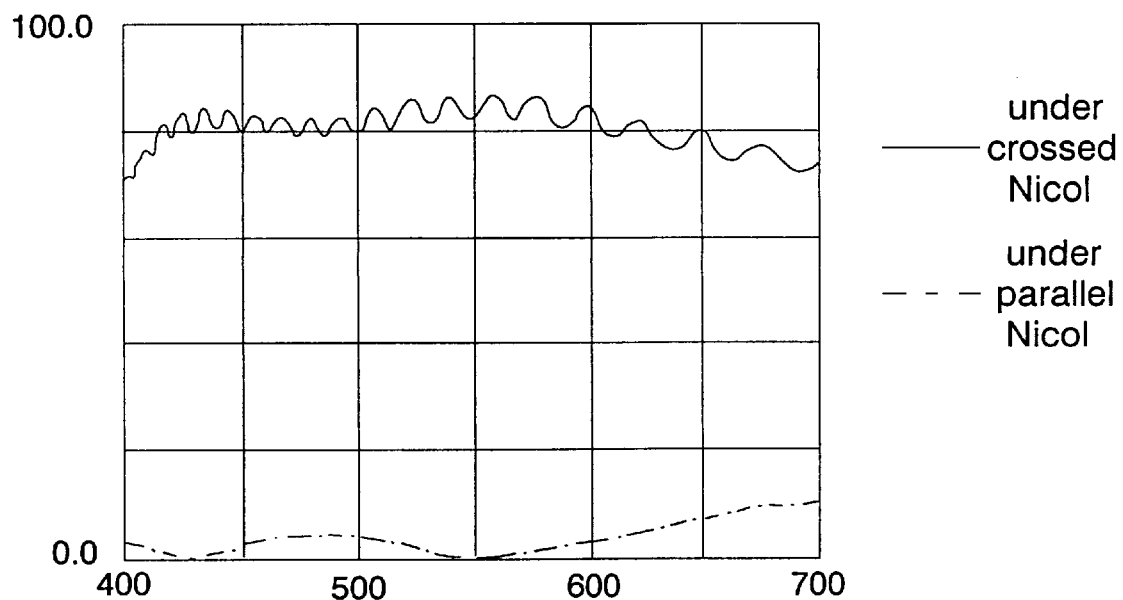
FIG. 3 shows transmission spectra under parallel and crossed Nicols in Example 8 of the present invention.

What is claimed is:

1. An optical film formed substantially from a liquid crystalline material constituted essentially by a liquid crystalline polyester, said liquid crystalline polyester having the following structural units (A) and (B) as essential structural units, assuming a liquid crystal state at a temperature higher than the liquid crystal transition point of the polyester and a glassy state at a temperature lower than the liquid crystal transition point of the polyester, and having an inherent viscosity, η, of 0.04 to 0.4 dl/g as determined in a mixed phenol/tetrachloroethane (weight ratio: 60/40) solvent at 30° C.:

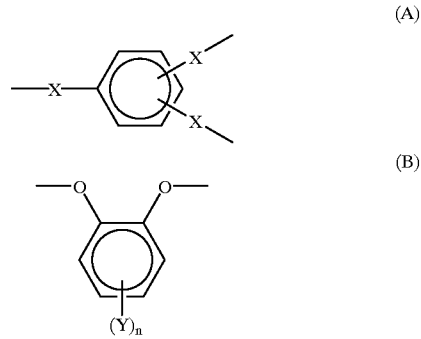

where each X represents O or C=O independently, each Y is independently selected from F, Cl, Br, and an alkyl group having 1 to 4 carbon atoms, and n is 0 or 1.

2. An optical film as set forth in claim 1, wherein said liquid crystalline material does not essentially contain any optically active component.

3. An optical film as set forth in claim 1, wherein said liquid crystalline material has an optically active group in the molecule of said liquid crystalline polyester.

4. An optical film as set forth in claim 1, wherein said liquid crystalline material substantially comprises said liquid crystalline polyester and an optically active compound.

5. An optical film as set forth in claim 1, wherein the structural unit (A) is derived from 1,3,5-benzenetricarboxylic acid, 1,2,4-benzenetricarboxylic acid, or 1,3,5-trihydroxybenzene.

* * * * *